(12) United States Patent
Zhou

(10) Patent No.: US 9,898,851 B2
(45) Date of Patent: Feb. 20, 2018

(54) ICON ANIMATION BASED ON DETECTED ACTIVITY

(71) Applicant: Eyespage Inc., Dublin, CA (US)

(72) Inventor: Jing Zhou, Beijing (CN)

(73) Assignee: Eyespage Inc., Dublin, CA (US)

( * ) Notice: Subject to any disclaimer, the term of this patent is extended or adjusted under 35 U.S.C. 154(b) by 338 days.

(21) Appl. No.: 14/749,166

(22) Filed: Jun. 24, 2015

(65) Prior Publication Data
US 2016/0379397 A1    Dec. 29, 2016

(51) Int. Cl.
*G06T 11/00* (2006.01)
*G06T 13/80* (2011.01)
*G06F 3/0481* (2013.01)
*G06F 3/0484* (2013.01)
*G09G 5/377* (2006.01)
*G06F 3/0482* (2013.01)
*G06F 3/0488* (2013.01)

(52) U.S. Cl.
CPC ............ *G06T 13/80* (2013.01); *G06F 3/0482* (2013.01); *G06F 3/04817* (2013.01); *G06F 3/04842* (2013.01); *G06F 3/04845* (2013.01); *G06F 3/04883* (2013.01); *G06F 3/04886* (2013.01); *G06T 11/001* (2013.01); *G09G 5/377* (2013.01); *G09G 2340/125* (2013.01); *G09G 2354/00* (2013.01)

(58) Field of Classification Search
CPC ............... G06F 3/04817; G06F 3/0482; G06F 3/04842; G06F 3/04845; G06T 11/001; G06T 13/80; G06T 3/40
See application file for complete search history.

(56) References Cited

U.S. PATENT DOCUMENTS

2006/0001658 A1* 1/2006 Plut ................ G06F 1/3218 345/211
2011/0010672 A1* 1/2011 Hope ................ G06F 3/04817 715/841

OTHER PUBLICATIONS

Video on "Windows folder animation", published on Jul. 20, 2012. https://www.youtube.com/watch?v=IQkJhCfk_Oo.*

* cited by examiner

*Primary Examiner* — Sing-Wai Wu
(74) *Attorney, Agent, or Firm* — Schwegman Lundberg & Woessner, P.A.

(57) ABSTRACT

A machine can be configured to provide icon animation based on an activity detected by a device. The configured machine animates an icon displayed on a screen by detecting a current activity in which a user of the machine is engaged. The detecting of the current activity may be based on context data generated by a set of sensors within the machine. The machine selects an icon from a first set of icons based on the current activity of the user. Furthermore, the machine causes the selected icon from the first set of icons to be displayed with a visibly moving highlight on the screen, resulting in the screen displaying the selected icon within a second set of icons on the screen. The visibly moving highlight may be applied to at least the selected icon but fewer than all icons in the displayed second set of icons.

25 Claims, 20 Drawing Sheets

ICON ANIMATION BASED ON DETECTED ACTIVITY

TECHNICAL FIELD

The subject matter disclosed herein generally relates to machines that are configured to process data. Specifically, the present disclosure addresses systems and methods to facilitate provision of a graphical user interface (GUI) with one or more icons.

BACKGROUND

Many machines (e.g., devices) communicate visual information to their users via one or more screens (e.g., light emitting display screens, projector screens, or heads-up displays). As an example of such a machine, a device (e.g., a portable hand-held device) may include a touch-sensitive screen (e.g., a touchscreen) that is configured to both display visual information and detect user input in the form of various touches (e.g., taps, double taps, drags, pinches, and reverse pinches).

A device with a touch-sensitive screen can be configured (e.g., programmed) to display one or more icons on a screen of the device. For example, the one or more icons may be superimposed over a background image on the screen. An icon may be operable (e.g., by a touch input provided by a user of the device) to activate, execute (e.g., launch), or otherwise access an application or a folder stored by the device. Generally, a folder is a data structure that contains one or more applications (e.g., as executable files), one or more sub-folders, or any suitable combination thereof. Accordingly, an icon may be an application icon that, for example, is operable to launch an application stored on the device, while another icon may be a folder icon that, for example, is operable to access a folder stored on the device.

BRIEF DESCRIPTION OF THE DRAWINGS

Some embodiments are illustrated by way of example and not limitation in the figures of the accompanying drawings.

DETAILED DESCRIPTION

Figure 1:
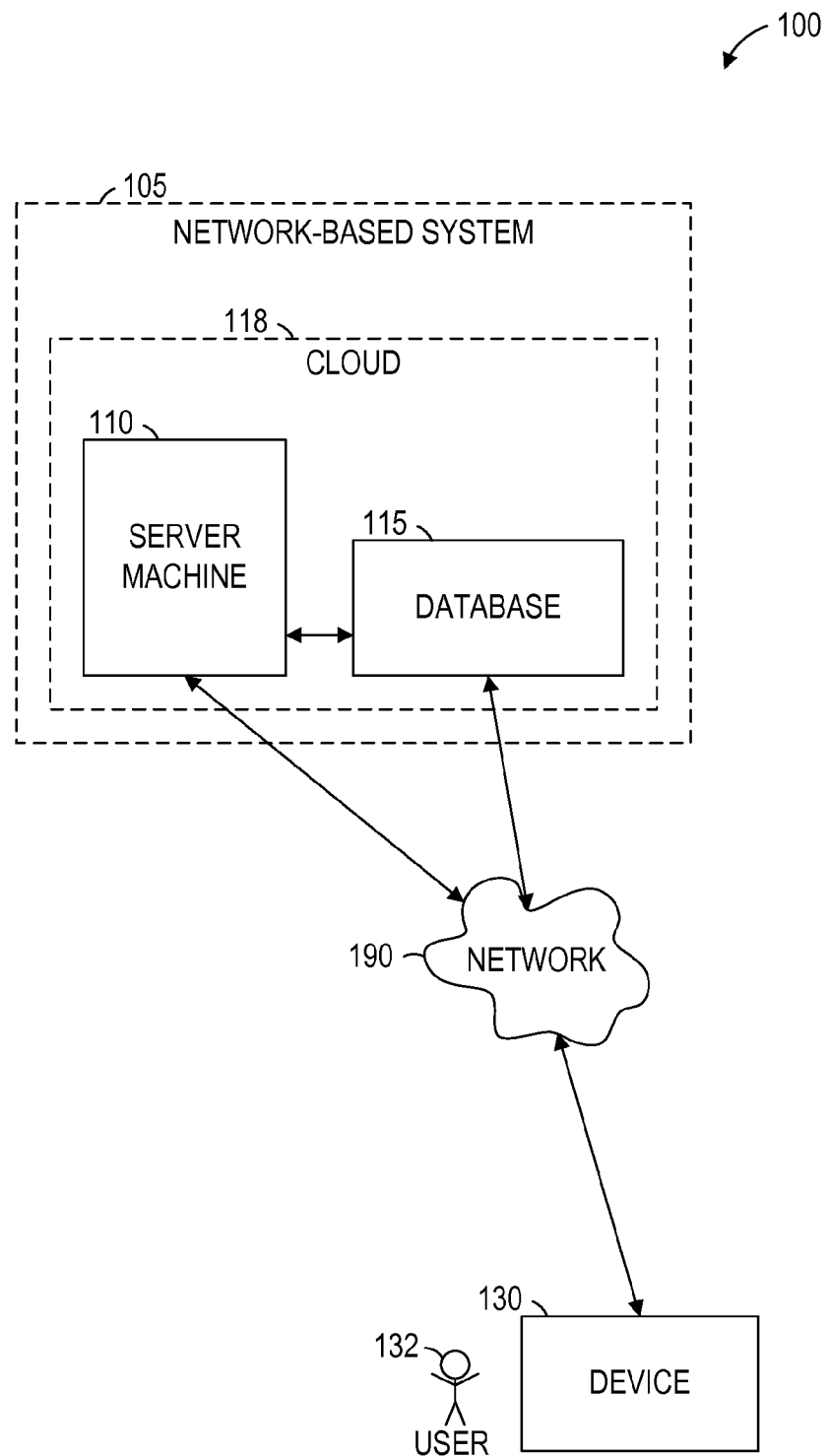
FIG. 1 is a network diagram illustrating a network environment suitable for generating icon animation based on detected activity, according to some example embodiments.

Example methods and systems are directed to generating, providing, or otherwise facilitating icon animation based on detected activity, for example, within a GUI on a screen of a device. Examples merely typify possible variations. Unless explicitly stated otherwise, components (e.g., modules) and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A machine in the example form of a device can be configured (e.g., programmed by one or more software modules) to provide icon animation based on an activity (e.g., a current activity, such as a first current activity) being detected by the device (e.g., via data generated or otherwise gathered by one or more sensors). As configured, the device automatically selects an icon to be highlighted, displays the automatically selected icon on a screen of the device, and animates the automatically selected icon on the screen of the device, according to any one or more of the methodologies discussed herein. Furthermore, the device can be configured to continue activity detection such that, in response to another activity (e.g., a second current activity) being detected by the device, the device automatically selects another icon (e.g., a second icon) to be highlighted and highlights the newly selected icon on the screen of the device, according to any one or more the methodologies discussed herein.

In various example embodiments, the device includes a detection module (e.g., comprising one or more processors of the device) configured to detect a current activity in which a user of the device is engaged. The detecting of the current activity may be based on (e.g., responsive to) context data generated by a set of sensors within the device. The device also includes an icon module (e.g., comprising one or more processors of the device) configured to automatically select (e.g., choose, identify, specify or otherwise determine) a folder icon from a first set of folder icons based on the current activity of the user. Furthermore, the icon module is configured to cause the selected folder icon from the first set of folder icons to be displayed with a visibly moving highlight on a screen of the device, resulting in the screen of the device displaying the selected folder icon within a second set of folder icons being displayed by the screen. The visibly moving highlight may be applied to at least the selected folder icon but fewer than all folder icons in the displayed second set of folder icons. Generally, each folder icon in the displayed second set of folder icons corresponds to a different folder among a plurality of folders stored by the device. Moreover, each folder icon in the displayed second set of folder icons is typically operable to cause contents of its corresponding folder to be presented on the screen of the device.

For clarity, the discussion herein often focuses on animation of a folder icon (e.g., applying the visibly moving highlight to a folder icon). However, the methods and systems discussed herein are equally applicable to animation of an application icon (e.g., applying the visibly moving highlight to an application icon). Furthermore, the techniques discussed herein are additionally applicable to icons in general (e.g., an icon that is neither a folder icon nor an application icon).

FIG. 1 is a network diagram illustrating a network environment 100 suitable for generating icon animation based on detected activity, according to some example embodiments. The network environment 100 includes a server machine 110, a database 115, and a device 130 (e.g., a user device), all communicatively coupled to each other via a network 190. The server machine 110 may form all or part of a cloud 118 (e.g., a geographically distributed set of multiple machines configured to function as a single server), which may form all or part of a network-based system 105 (e.g., a cloud-based server system configured to provide one or more services to the device 130). The server machine 110 and the device 130 may each be implemented in a computer system, in whole or in part, as described below with respect to FIG. 20.

Also shown in FIG. 1 is a user 132. The user 132 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, a smartphone, or a wearable device (e.g., a smart watch or smart glasses) belonging to the user 132.

Any of the machines, databases, or devices shown in FIG. 1 may be implemented in a special-purpose computer that has been modified (e.g., configured or programmed) by software (e.g., one or more software modules) to perform one or more of the functions described herein for that machine, database, or device. For example, a computer system able to implement any one or more of the methodologies described herein is discussed below with respect to FIG. 20. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
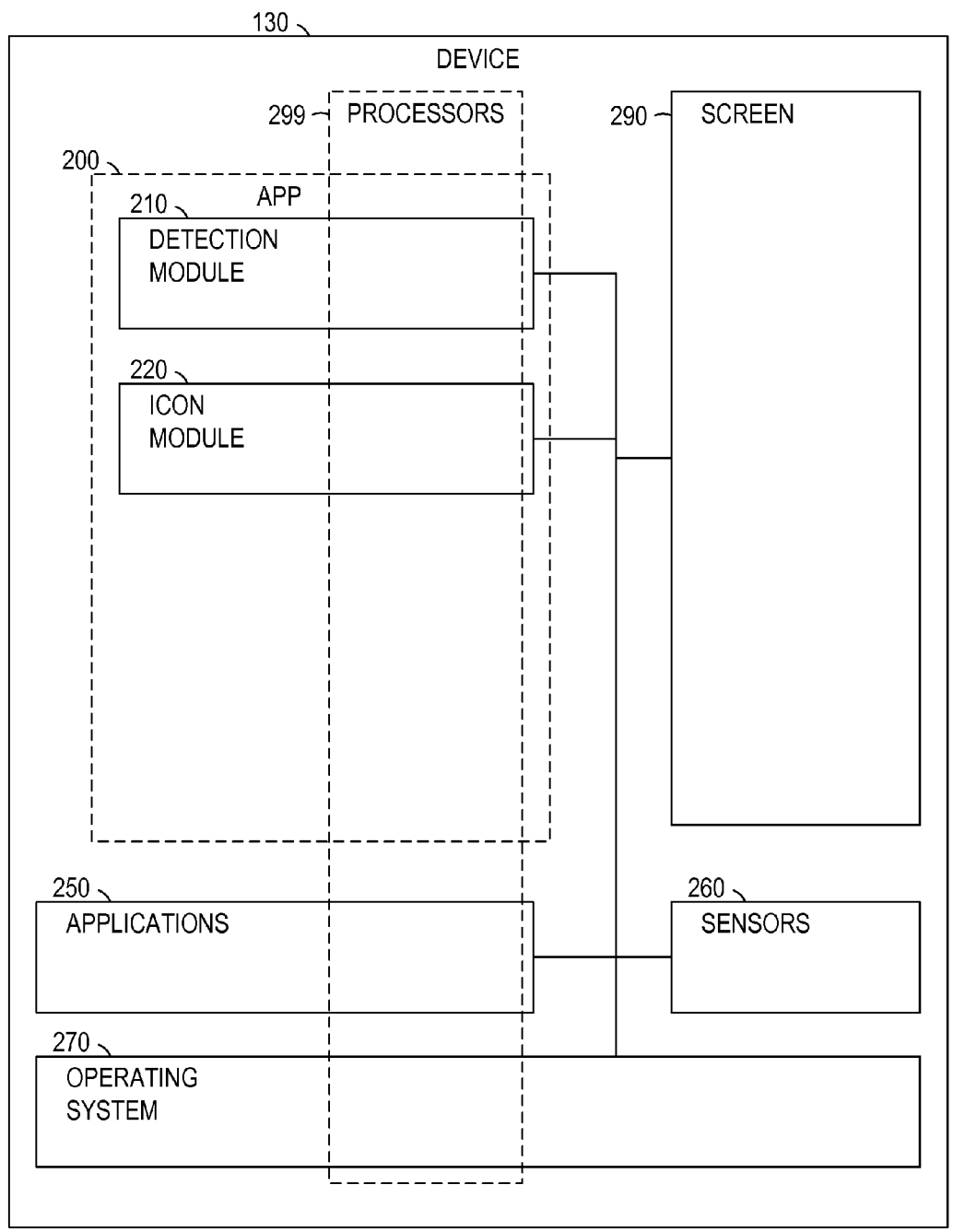
FIG. 2 is a block diagram illustrating components of a device configured to generate icon animation based on detected activity, according to some example embodiments.

FIG. 2 is a block diagram illustrating components of the device 130 configured to generate icon animation based on detected activity, according to some example embodiments. The device 130 is shown as including a detection module 210, an icon module 220, one or more applications 250 (e.g., software programs, mobile apps, or other executable applications), one or more sensors 260, an operating system 270, and a screen 290 (e.g., a touch-sensitive screen), all configured to communicate with each other (e.g., via a bus, shared memory, or a switch).

The detection module 210 may be configured to detect a current activity of the user 132. In some example embodiments, the detection module 210 is or includes software that configures one or more of the processors 299 to detect the current activity of the user 132. The icon module 220 may be configured to select an icon (e.g., a folder icon) based on the current activity of the user 132 and cause the selected icon to be displayed with an animated effect on the screen 290. In certain example embodiments, the icon module 220 is or includes software that configures one or more the processors 299 to perform these operations. In some example embodiments, the detection module 210 may be referred to as an activity module (e.g., configured to detect a current activity of the user 132).

As shown in FIG. 2, the detection module 210 and the icon module 220 may form all or part of an app 200 (e.g., a mobile app) that is stored (e.g., installed) on the device 130 (e.g., responsive to or otherwise as a result of data being received from the server machine 110 via the network 190). Furthermore, one or more processors 299 (e.g., hardware processors, digital processors, or any suitable combination thereof) may be included (e.g., temporarily or permanently) in the app 200, the detection module 210, the icon module 220, the applications 250, the operating system 270, or any suitable combination thereof.

The screen 290 may be or include a touch-sensitive screen (e.g., a touchscreen or other touch-detecting display component). The sensors 260 may be or include any type of data generating input component configured to detect information about the device 130 and its surrounding environment. Examples of such input components are discussed below with respect to FIG. 20.

Any one or more of the modules described herein may be implemented using hardware alone (e.g., one or more processors 299) or a combination of hardware and software. For example, any module described herein may physically include an arrangement of one or more processors 299 (e.g., a subset of or among the one or more processors of the machine) configured to perform the operations described herein for that module. As another example, any module described herein may include software, hardware, or both, that configure an arrangement of one or more processors 299 (e.g., among the one or more processors of the machine) to perform the operations described herein for that module. Accordingly, different modules described herein may include and configure different arrangements of such processors 299 or a single arrangement of such processors 299 at different points in time. Moreover, any two or more modules described herein may be combined into a single module, and the functions described herein for a single module may be subdivided among multiple modules. Furthermore, according to various example embodiments, modules described herein as being implemented within a single machine, database, or device may be distributed across multiple machines, databases, or devices.

FIGS. 3-15 are device diagrams illustrating the screen 290 of the device 130 and illustrating icons 301, 302, 303, 304, 305, 306, 307, 308, 309, 310, 311, and 312 (e.g., folder icons, application icons, or any suitable combination thereof) with various icon animations that may be generated based on detected activity, according to some example embodiments. A finger of the user 132 is shown to indicate that touch-based input is detectable by the screen 290, such that any icons displayed by the screen 290 are operable by the finger (e.g., to launch or otherwise access a corresponding folder or application).

Figure 3:
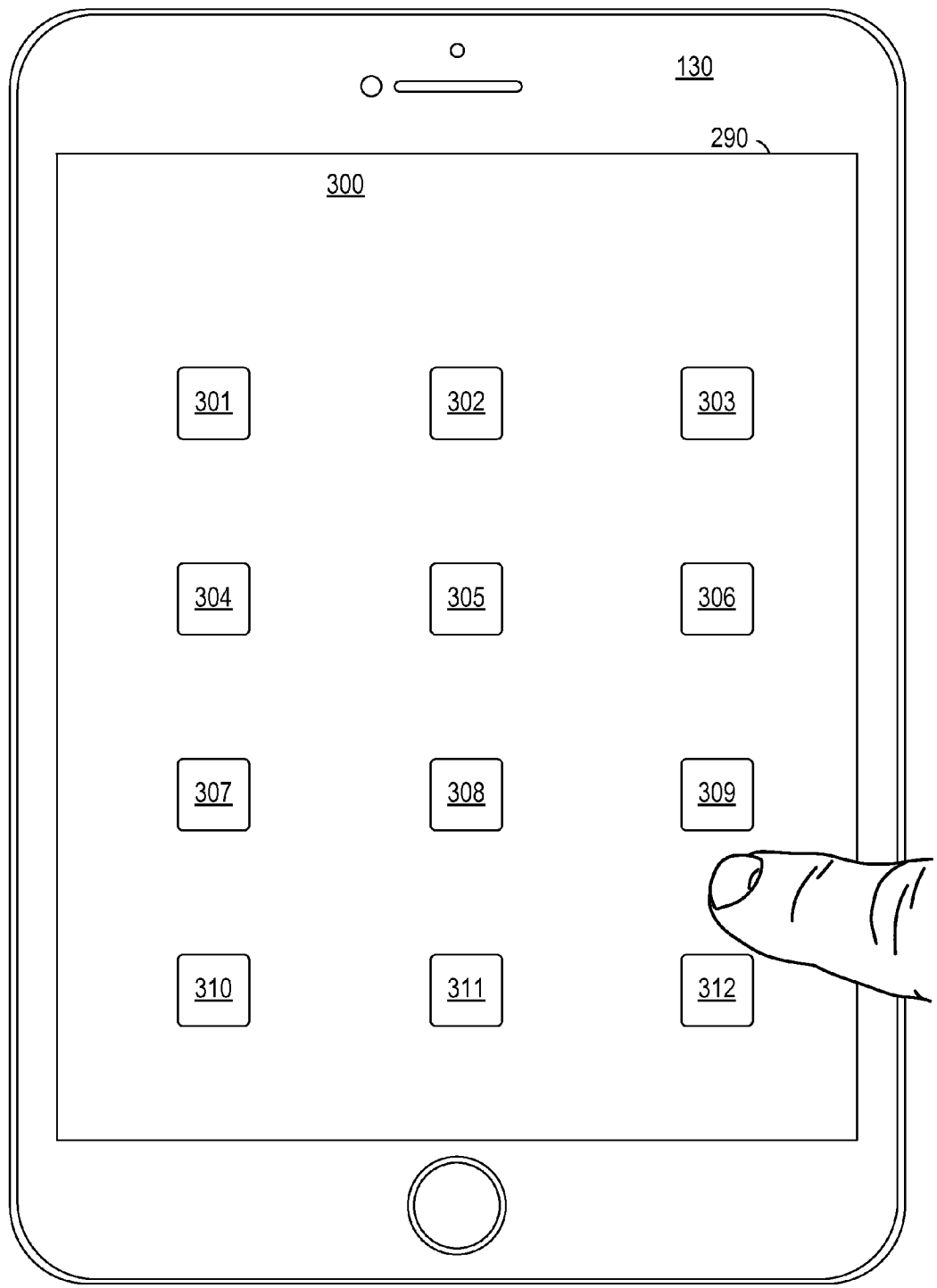
FIGS. 3-15 are device diagrams illustrating a screen of the device and illustrating icons with various icon animations that may be generated based on detected activity, according to some example embodiments.

In FIG. 3, the device 130 is depicted in the example form of a smart phone or tablet computer showing contents of the screen 290. In the example embodiments shown in FIG. 3, the screen 290 is displaying the icons 301-312, as well as portions of the background image 300 (e.g., portions not occluded by the icons 301-312). According to some example embodiments, the icons 301-312 are superimposed over the background image 300, while in other example embodiments, the icons 301-312 replace corresponding portions of the background image 300 such that the icons 301-312 visually appear to be superimposed over the background image 300.

Figure 4:
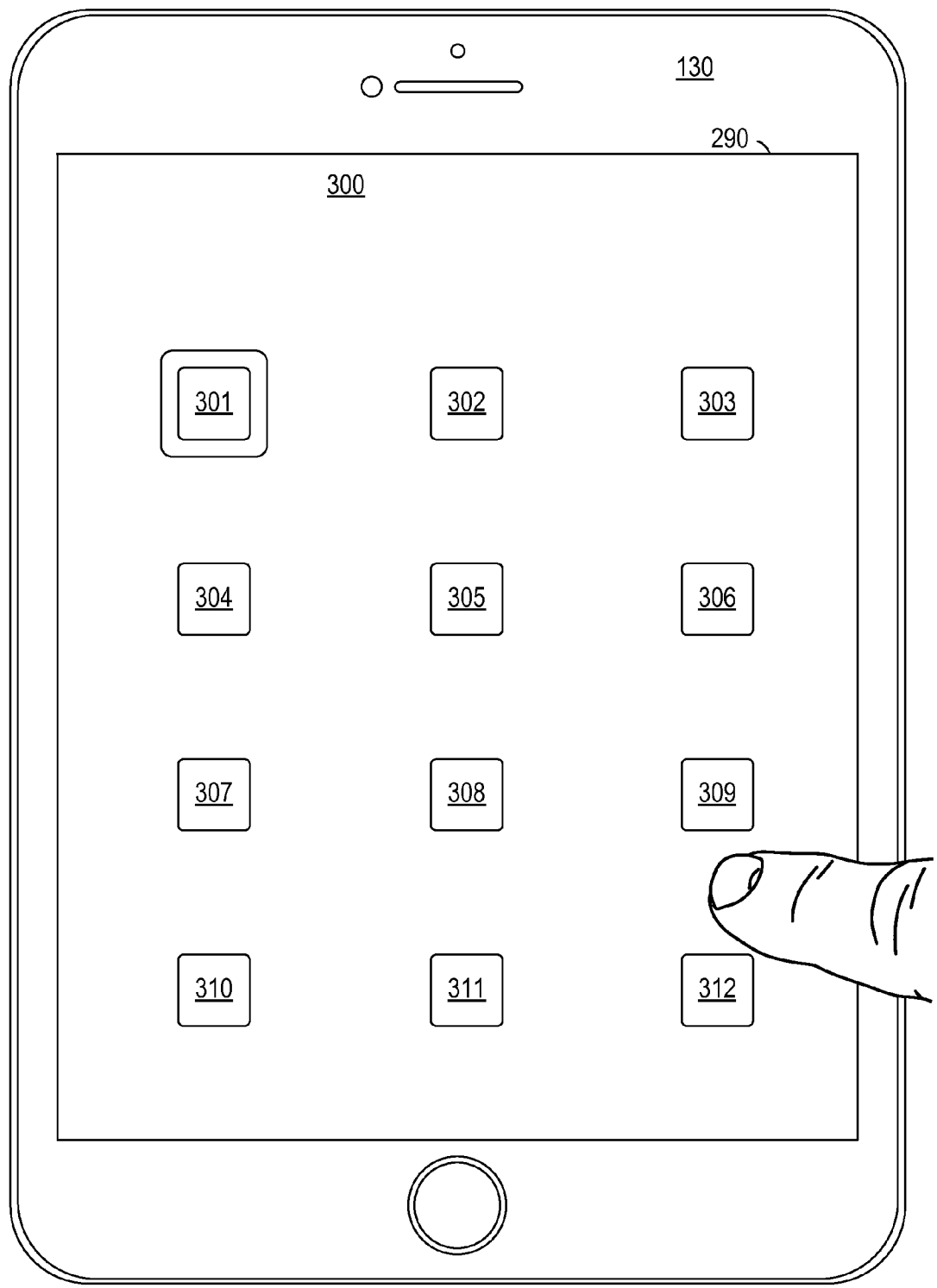
Figure 5:
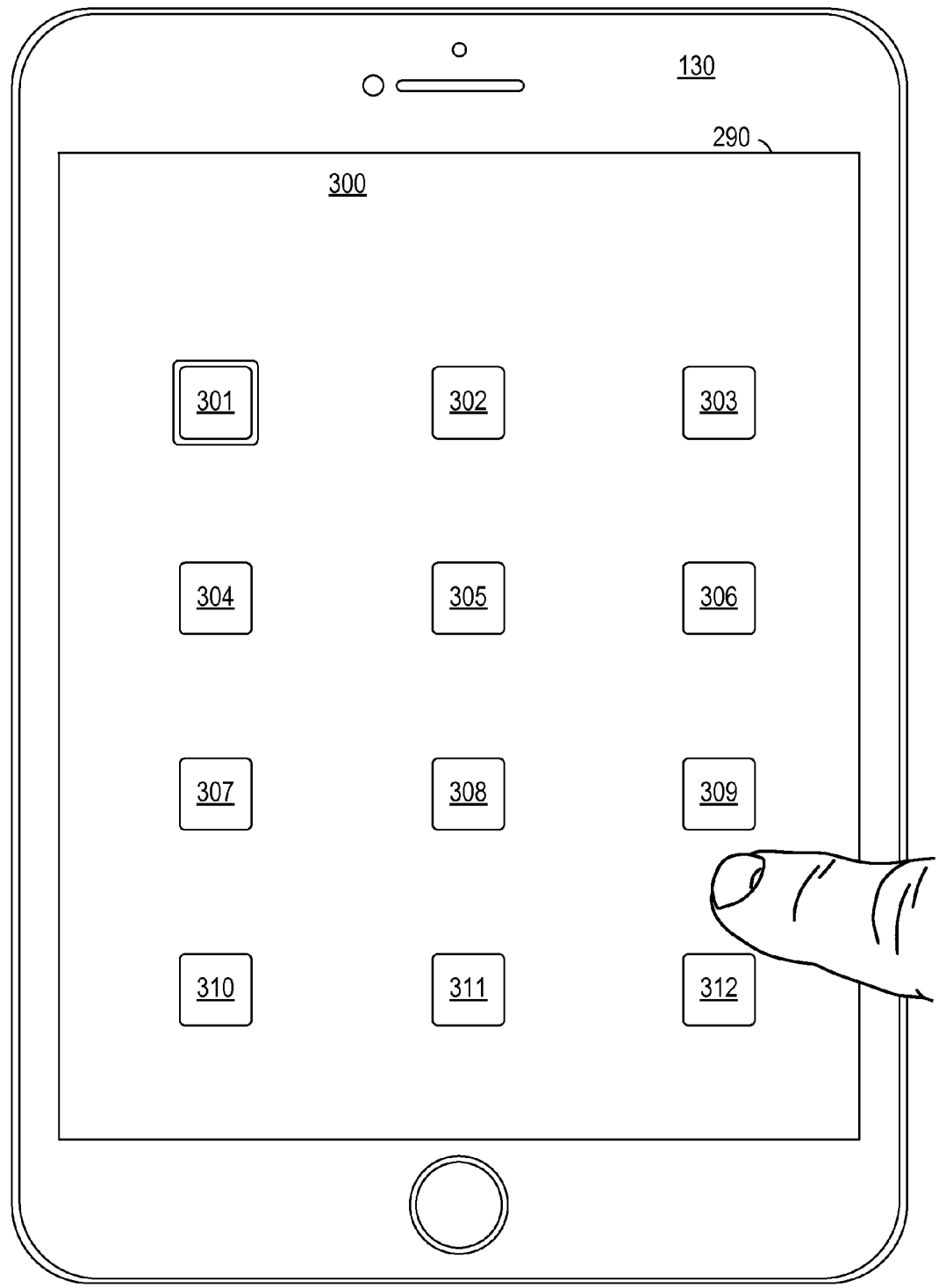

FIGS. 4 and 5 together depict an icon animation applied to highlight the icon 301, according to some example embodiments. The icon animation may periodically or otherwise repeatedly display the appearances of the screen 290 shown in FIGS. 4 and 5 (e.g., among a set of multiple appearances of the screen 290). For example, the appearances may cyclically repeat with a period in the range of 0.5 seconds to 5 seconds (e.g., in the range of 1 second to 3 seconds, such as 2 seconds). This may have the effect of causing the screen 290 to depict an animated pulsating aura on at least one outer boundary of the icon 301. According to various example embodiments, this may be accomplished by modifying the icon 301, modifying the background image 300 (e.g., by adding one or more image sprites), or any suitable combination thereof. The icon animation may be applied to the icon 301 based on (e.g., in response to) the icon 301 being automatically selected (e.g., as a relevant icon, such as a most relevant icon) based on a current activity (e.g., a first activity) of the user 132 being detected (e.g., based on an analysis of data gathered by the sensors 260).

Figure 6:
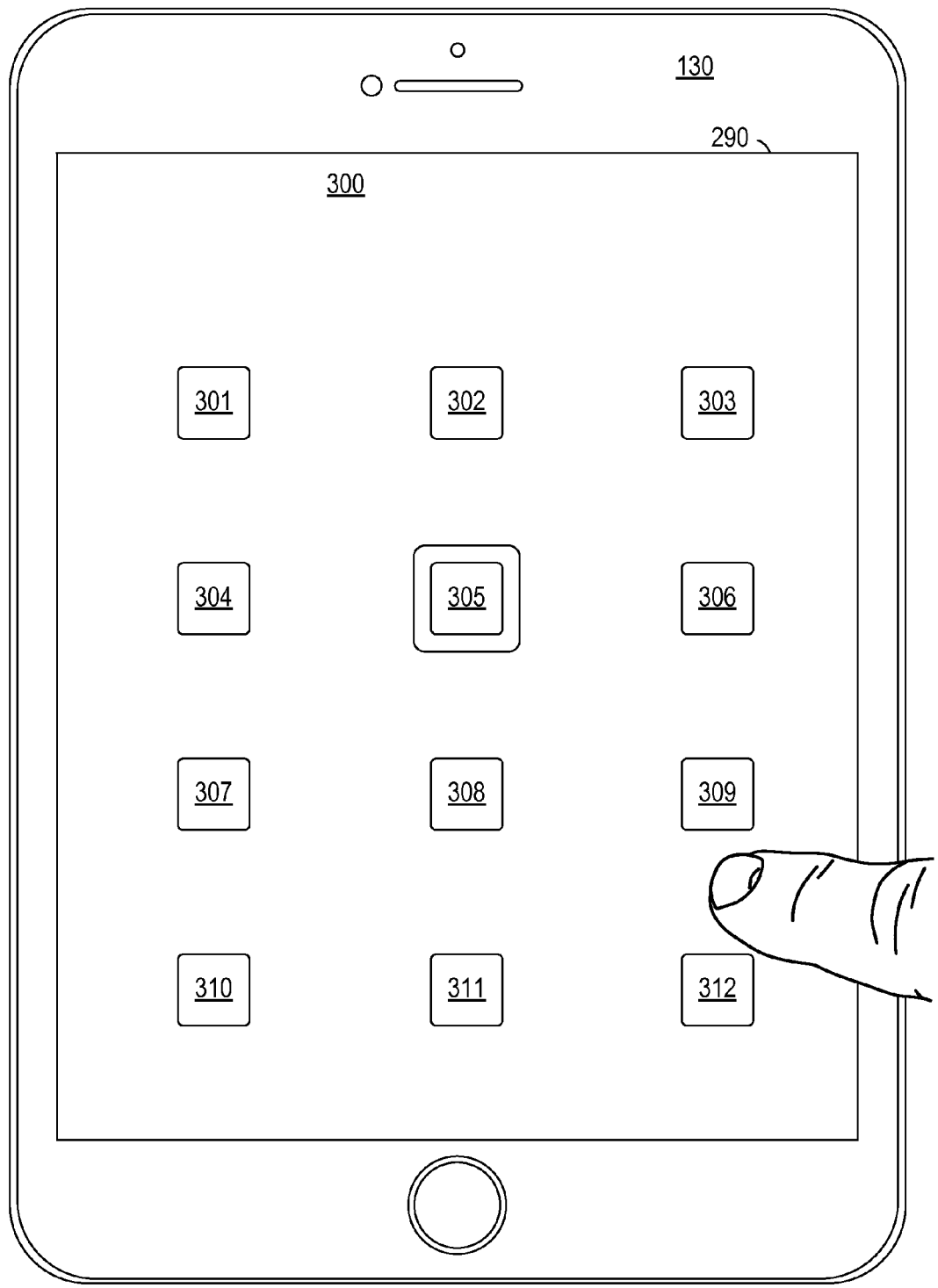
Figure 7:
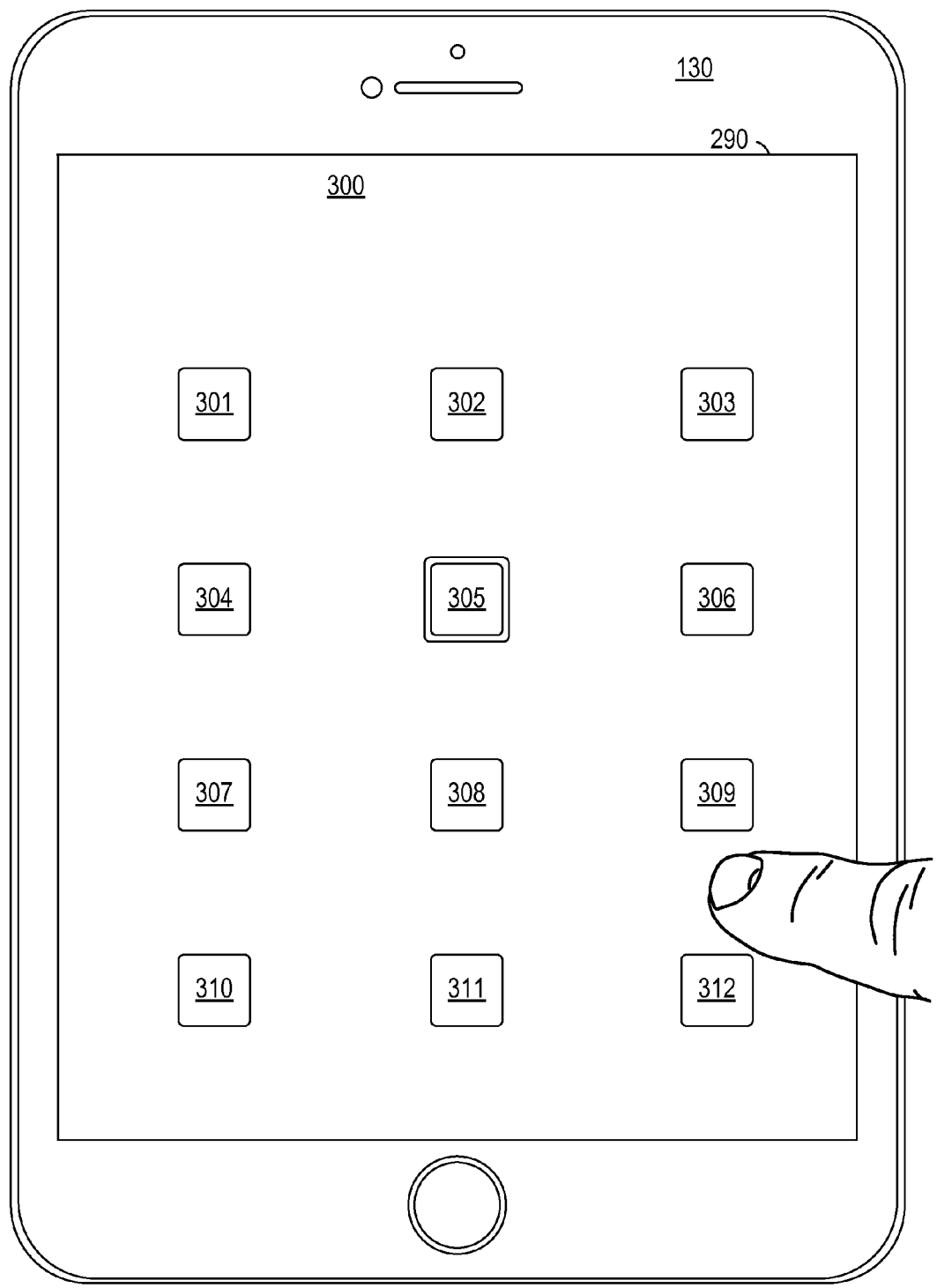

FIGS. 6 and 7 together depict the icon animation of FIGS. 4 and 5 being applied to the icon 305, according to some example embodiments. The icon animation may periodically or otherwise repeatedly display the appearances of the screen 290 shown in FIGS. 6 and 7 (e.g., among the set of multiple appearances of the screen 290). For example, the appearances may cyclically repeat a period in the range of 0.5 seconds to 5 seconds (e.g., in the range of 1 second to 3 seconds, such as, 2 seconds). This may have the effect of causing the screen 290 to depict an animated pulsating aura on at least one outer boundary of the icon 305. According to various example embodiments, this may be accomplished by modifying the icon 305, modifying the background image 300 (e.g., by adding one or more image sprites), or any suitable combination thereof. The icon animation may be applied to (e.g., moved from the icon 301 to) the icon 305 based on (e.g., in response to) the icon 305 being automatically selected (e.g., as a relevant icon, such as a most relevant icon) based on a current activity (e.g., a second activity after the first activity) of the user 132 being detected (e.g., based on an analysis of data gathered by the sensors 260).

Figure 8:
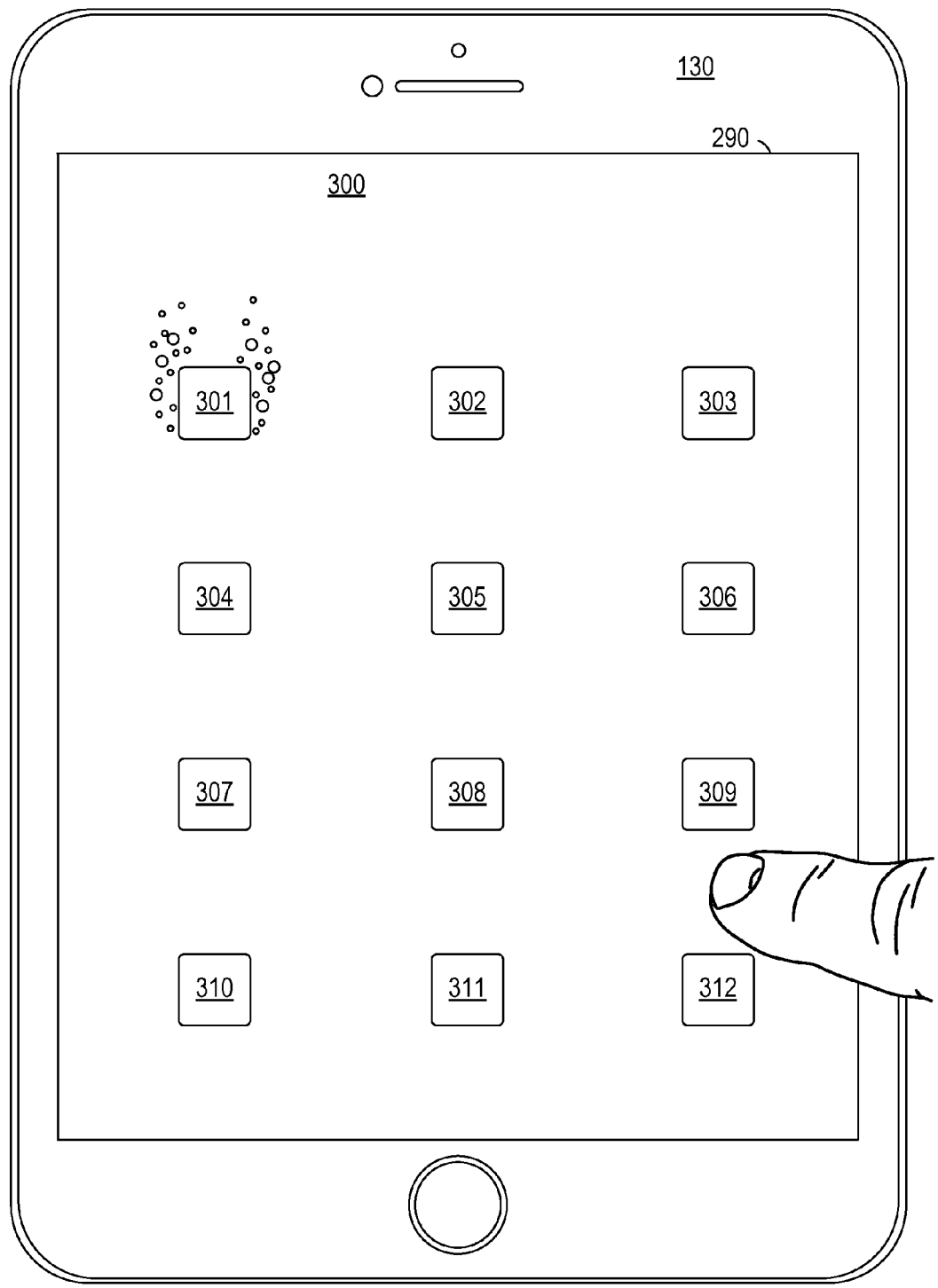
Figure 9:
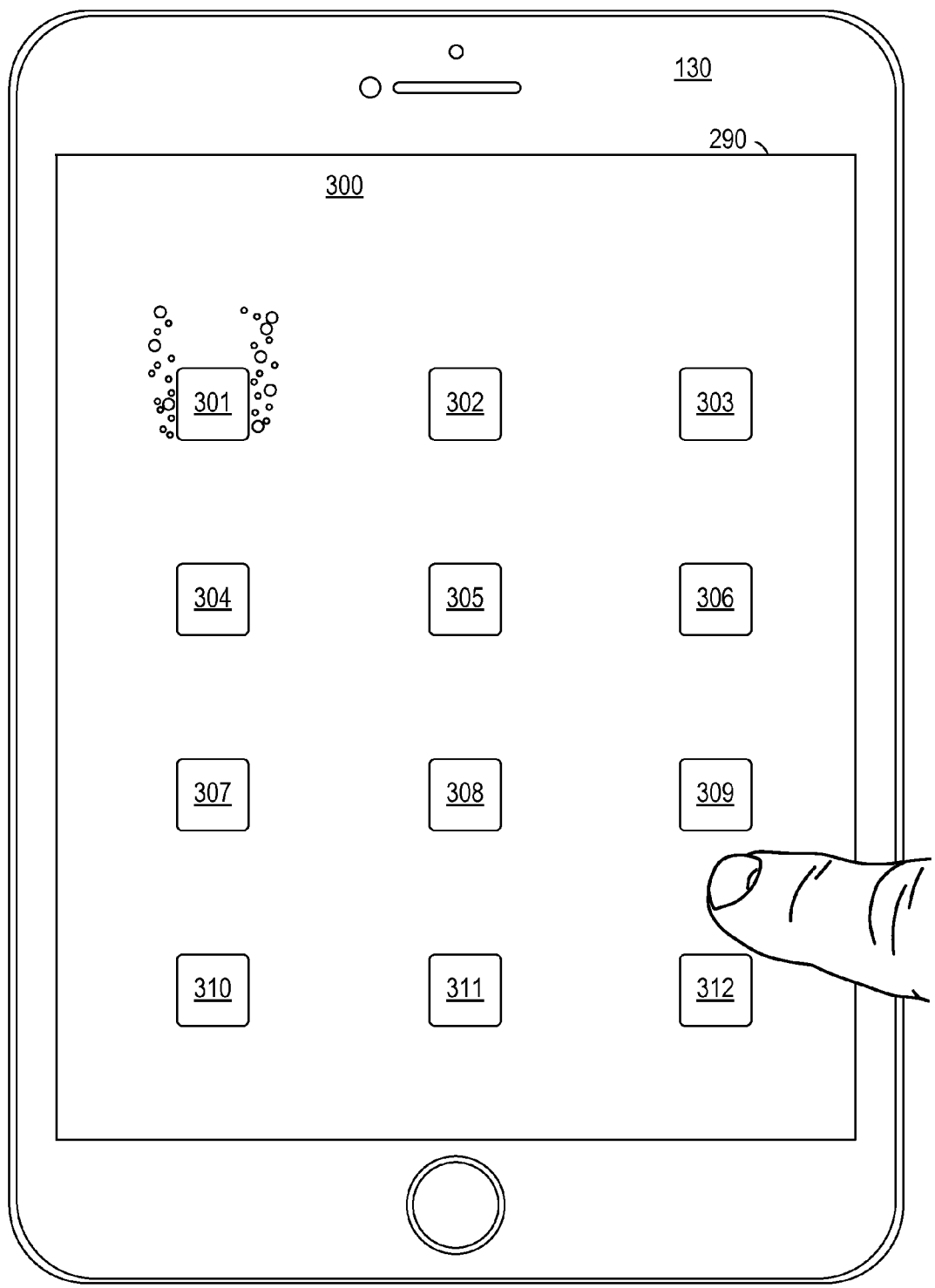

FIGS. 8 and 9 together depict another icon animation applied to highlight the icon 301, according to some example embodiments. The icon animation may periodically or otherwise repeatedly display the appearances of the screen 290 shown in FIGS. 8 and 9 (e.g., among a set of multiple appearances of the screen 290). For example, the appearances may cyclically repeat with a period in the range of 0.5 seconds to 5 seconds (e.g., in the range of 1 second to 3 seconds, such as 2 seconds). This may have the effect of causing the screen 290 to depict animated bubbles emanating and rising from the icon 301 within a region of the background image 300 centered on the icon 301. According to various example embodiments, this may be accomplished by modifying the icon 301, modifying the background image 300 (e.g., by adding one or more image sprites), or any suitable combination thereof. The icon animation may be applied to the icon 301 based on (e.g., in response to) the icon 301 being automatically selected (e.g., as a relevant icon, such as a most relevant icon) based on a current activity (e.g., a first activity) of the user 132 being detected (e.g., based on an analysis of data gathered by the sensors 260).

Figure 10:
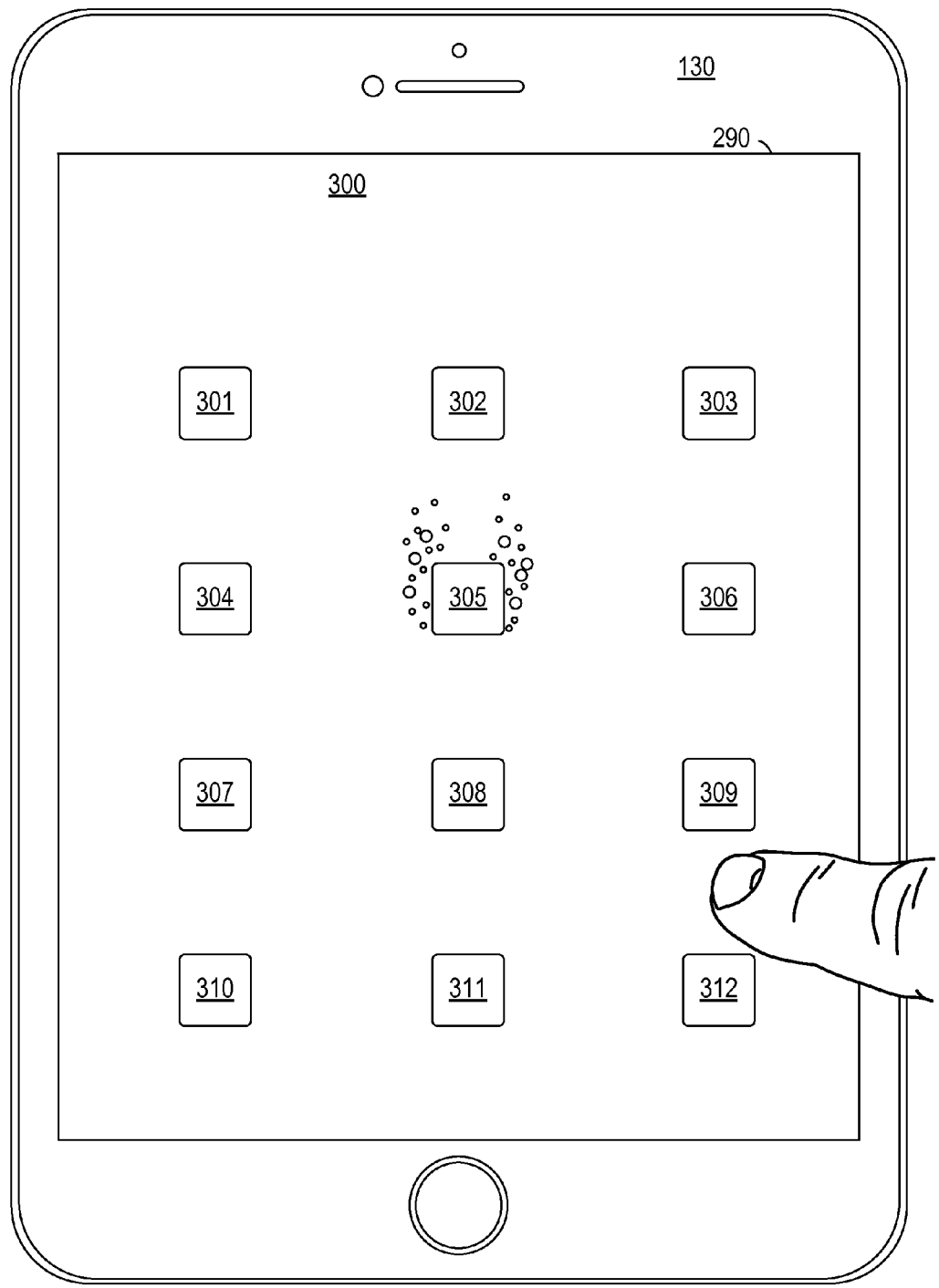
Figure 11:
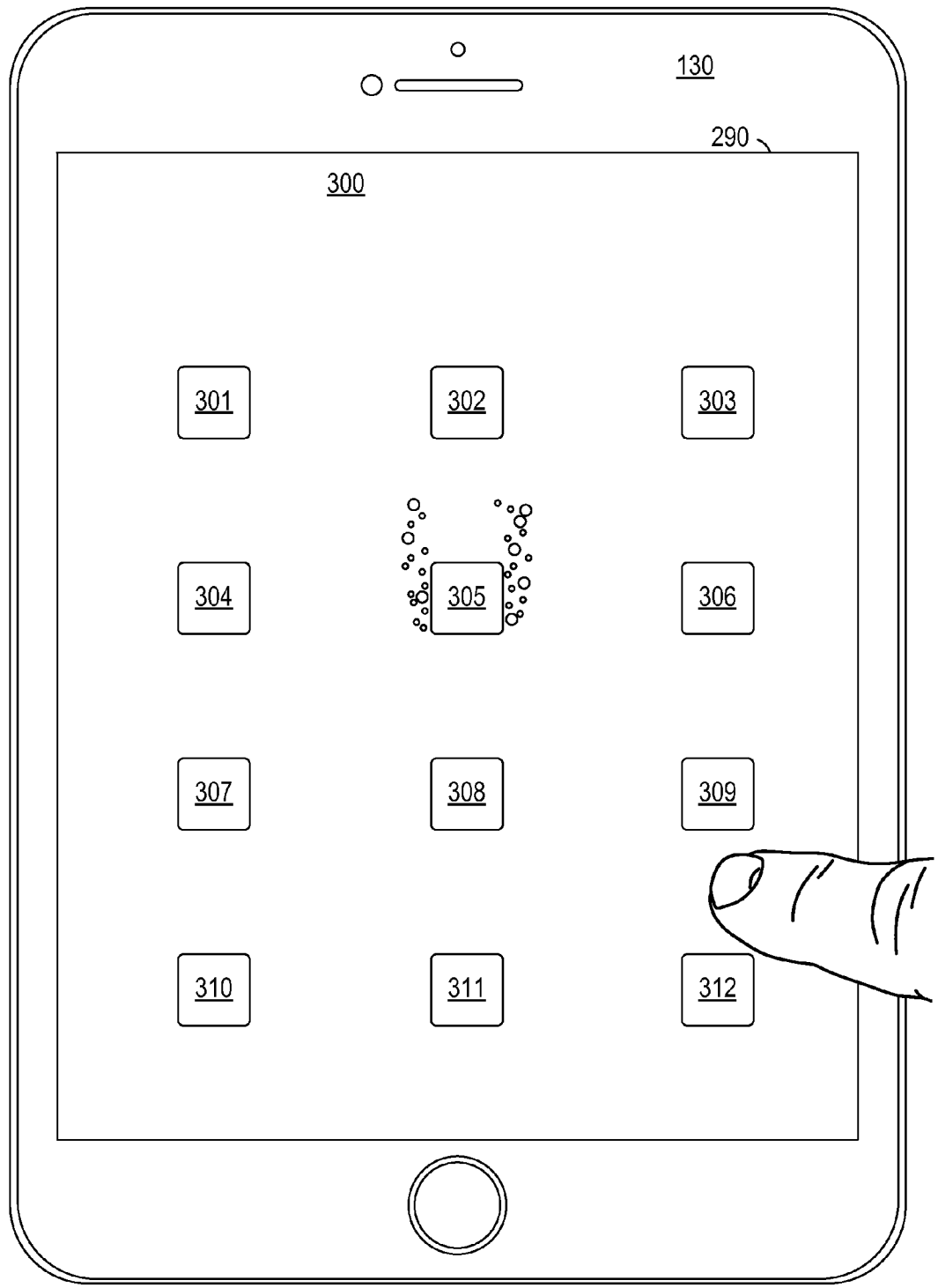

FIGS. 10 and 11 together depict the icon animation of FIGS. 8 and 9 being applied to the icon 305, according to some example embodiments. The icon animation may periodically or otherwise repeatedly display the appearances of the screen 290 shown in FIGS. 10 and 11 (e.g., among the set of multiple appearances of the screen 290). For example, the appearances may cyclically repeat with a period in the range of 0.5 seconds to 5 seconds (e.g., in the range of 1 second to 3 seconds, such as 2 seconds). This may have the effect of causing the screen 290 to depict animated bubbles emanating and rising from the icon 305 within a region of the background image 300 centered on the icon 305. According to various example embodiments, this may be accomplished by modifying the icon 305, modifying the background image 300 (e.g., by adding one or more image sprites), or any suitable combination thereof. The icon animation may be applied to (e.g., moved from the icon 301 to) the icon 305 based on (e.g., in response to) the icon 305 being automatically selected (e.g., as a relevant icon, such as a most relevant icon) based on a current activity (e.g., a second activity after the first activity) of the user 132 being detected (e.g., based on an analysis of data gathered by the sensors 260).

Figure 12:
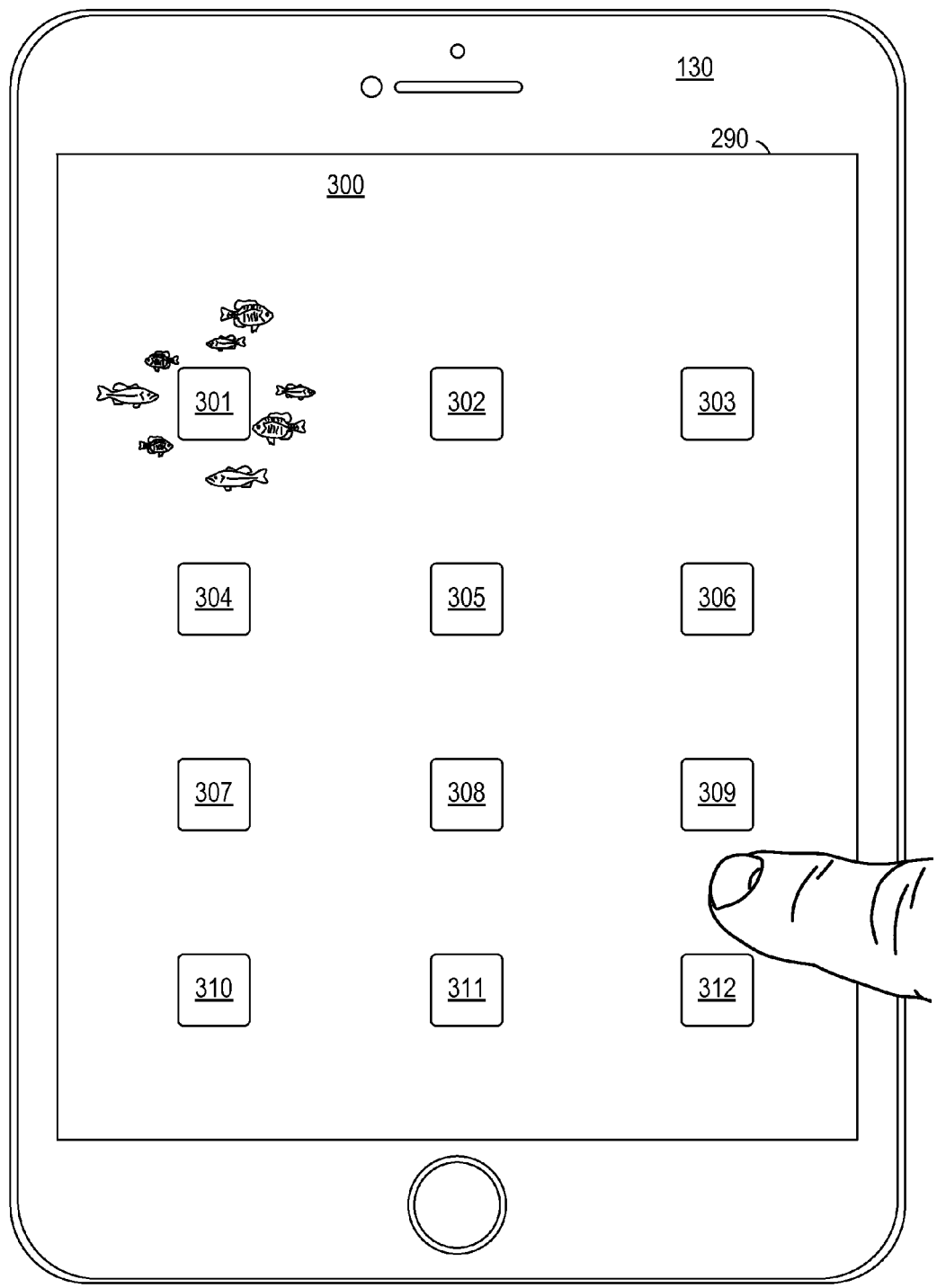
Figure 13:
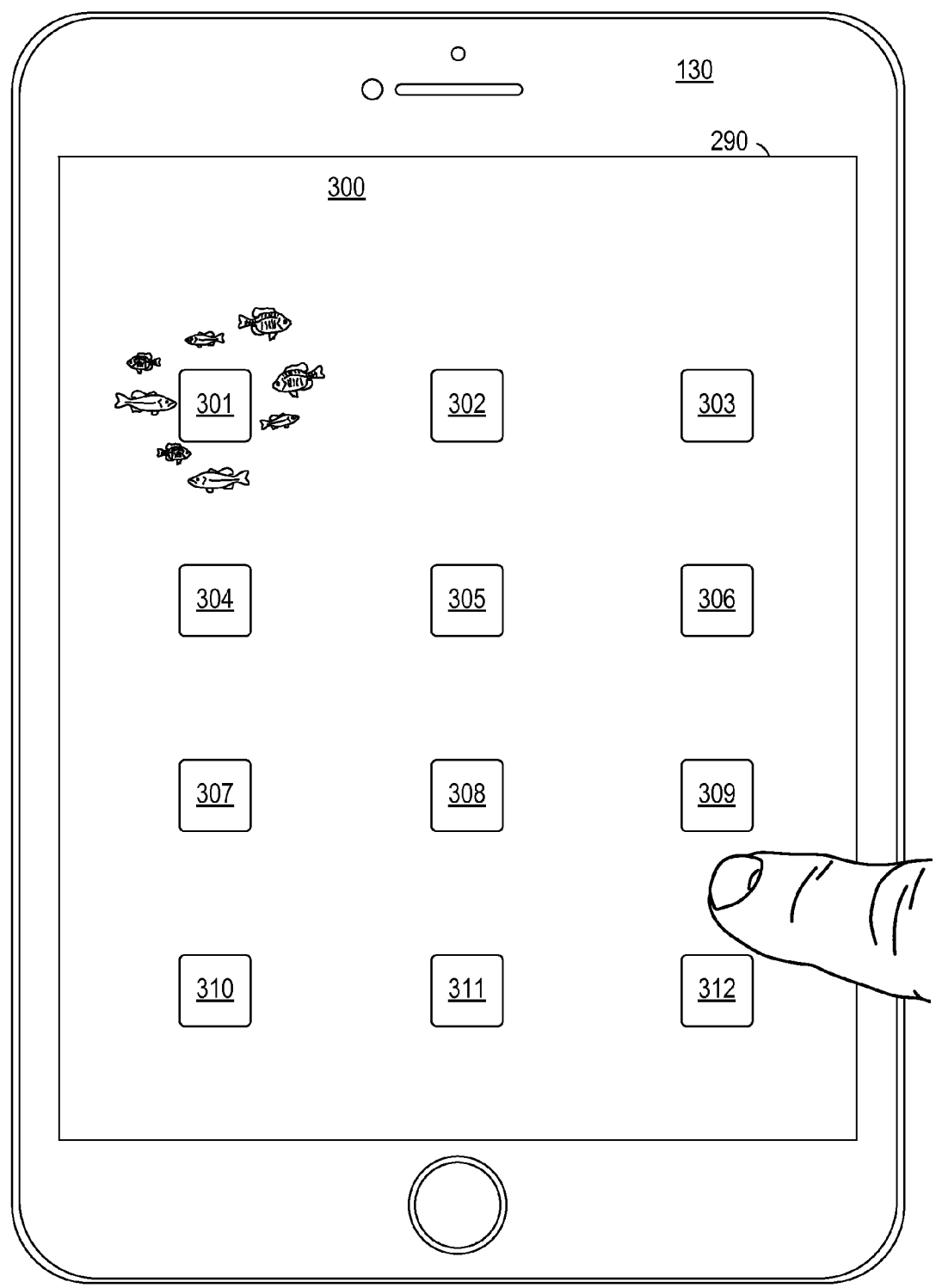

FIGS. 12 and 13 together depict yet another icon animation applied to highlight the icon 301, according to some example embodiments. The icon animation may periodically or otherwise repeatedly display the appearances of the screen 290 shown in FIGS. 12 and 13 (e.g., among a set of multiple appearances of the screen 290). For example, the appearances may cyclically repeat with a period in the range of 0.5 seconds to 5 seconds (e.g., in the range of 1 second to 3 seconds, such as 2 seconds). This may have the effect of causing the screen 290 to depict animated fish swimming around the icon 301 within a region of the background image 300 centered on the icon 301. According to various example embodiments, this may be accomplished by modifying the icon 301, modifying the background image 300 (e.g., by adding one or more image sprites), or any suitable combination thereof. The icon animation may be applied to the icon 301 based on (e.g., in response to) the icon 301 being automatically selected (e.g., as a relevant icon, such as a most relevant icon) based on a current activity (e.g., a first activity) of the user 132 being detected (e.g., based on an analysis of data gathered by the sensors 260).

Figure 14:
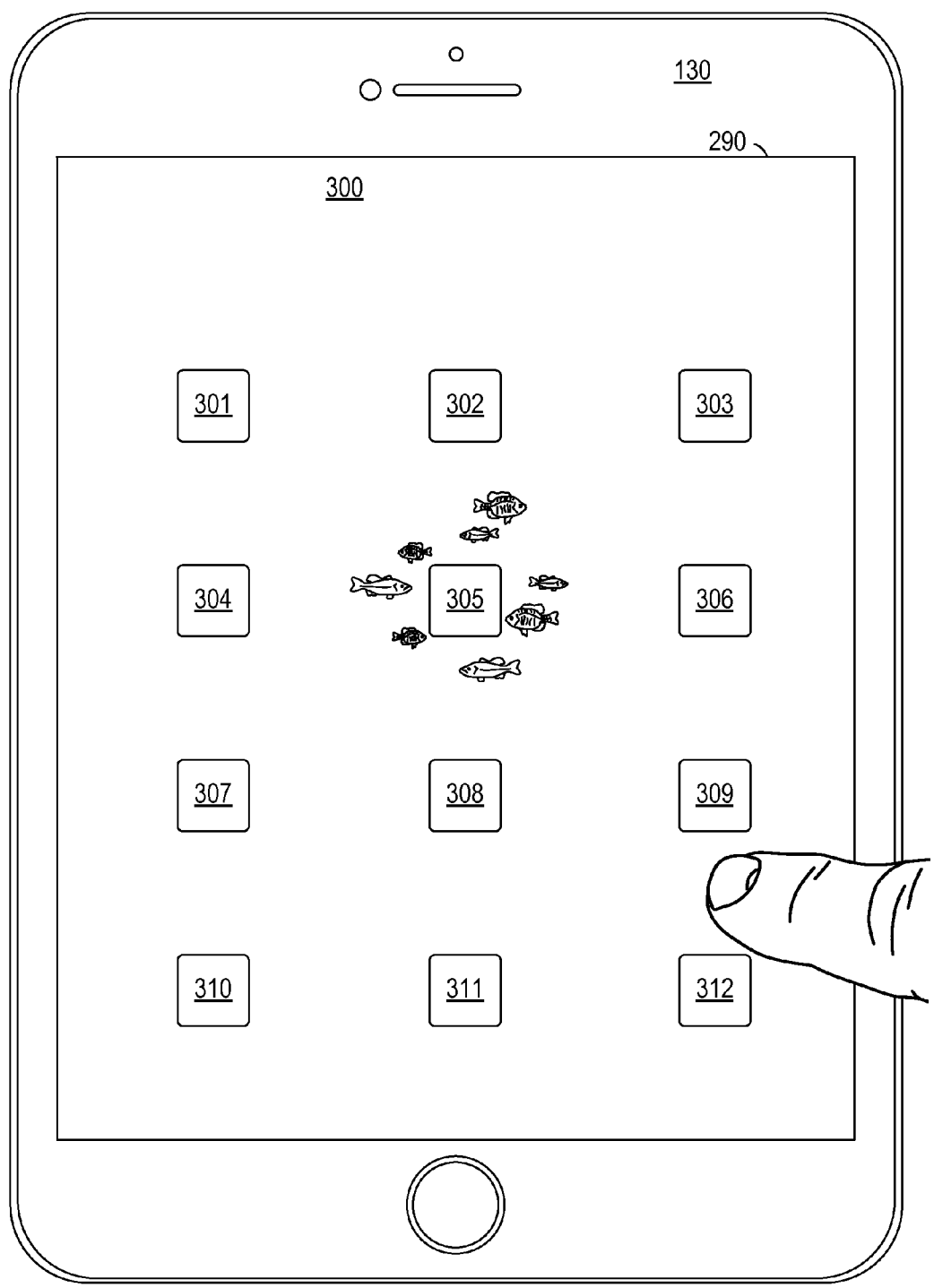
Figure 15:
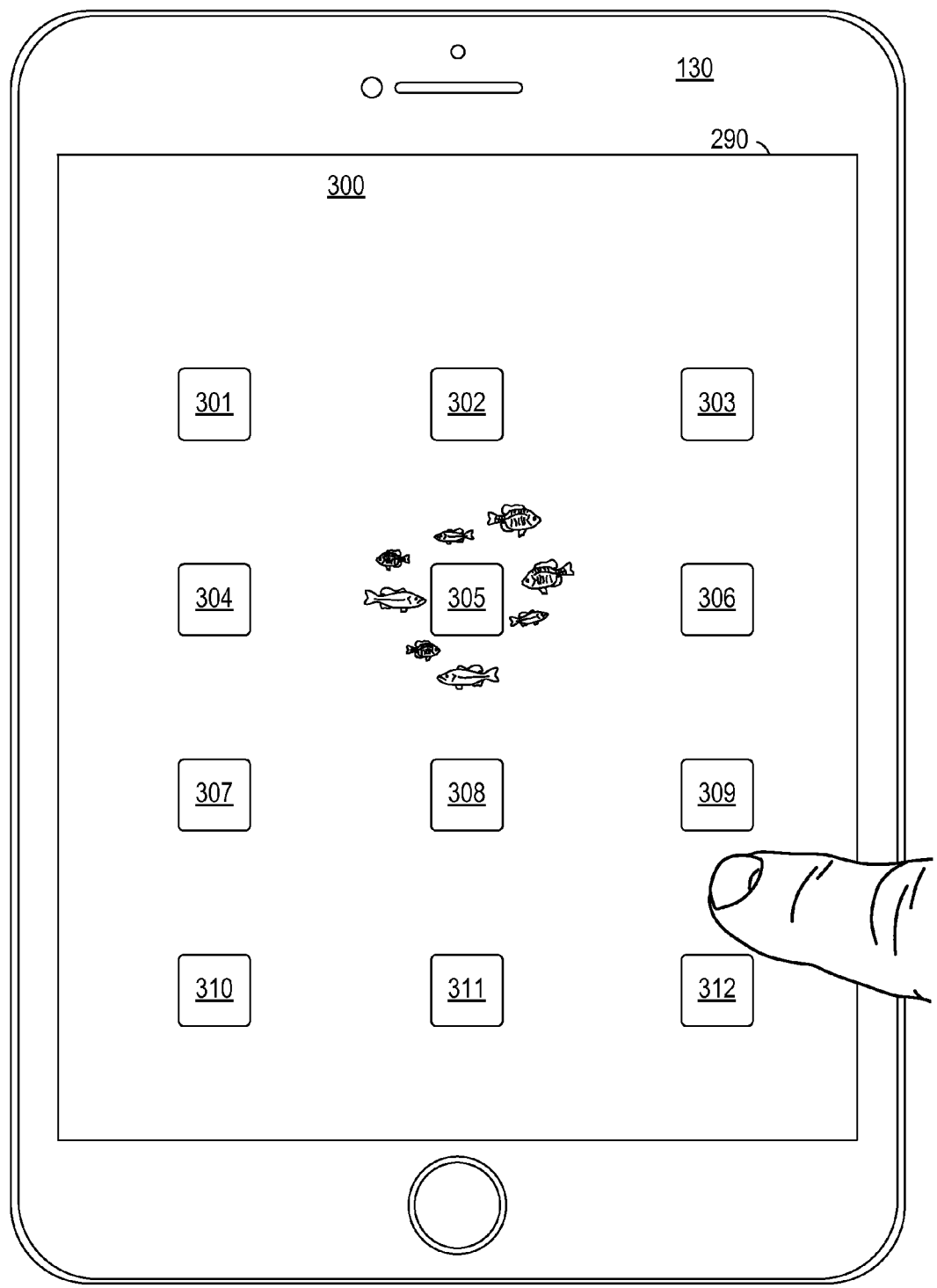

FIGS. 14 and 15 together depict the icon animation of FIGS. 12 and 13 being applied to the icon 305, according to some example embodiments. The icon animation may periodically or otherwise repeatedly display the appearances of the screen 290 shown in FIGS. 14 and 15 (e.g., among the set of multiple appearances of the screen 290). For example, the appearances may cyclically repeat with a period in the range of 0.5 seconds to 5 seconds (e.g., in the range of 1 second to 3 seconds, such as 2 seconds). This may have the effect of causing the screen 290 to depict animated fish swimming around the icon 305 within a region of the background image 300 centered on the icon 305. According to various example embodiments, this may be accomplished by modifying the icon 305, modifying the background image 300 (e.g., by adding one or more image sprites), or any suitable combination thereof. The icon animation may be applied to (e.g., moved from the icon 301 to) the icon 305 based on (e.g., in response to) the icon 305 being automatically selected (e.g., as a relevant icon, such as a most relevant icon) based on a current activity (e.g., a second activity after the first activity) of the user 132 being detected (e.g., based on an analysis of data gathered by the sensors 260).

Figure 16:
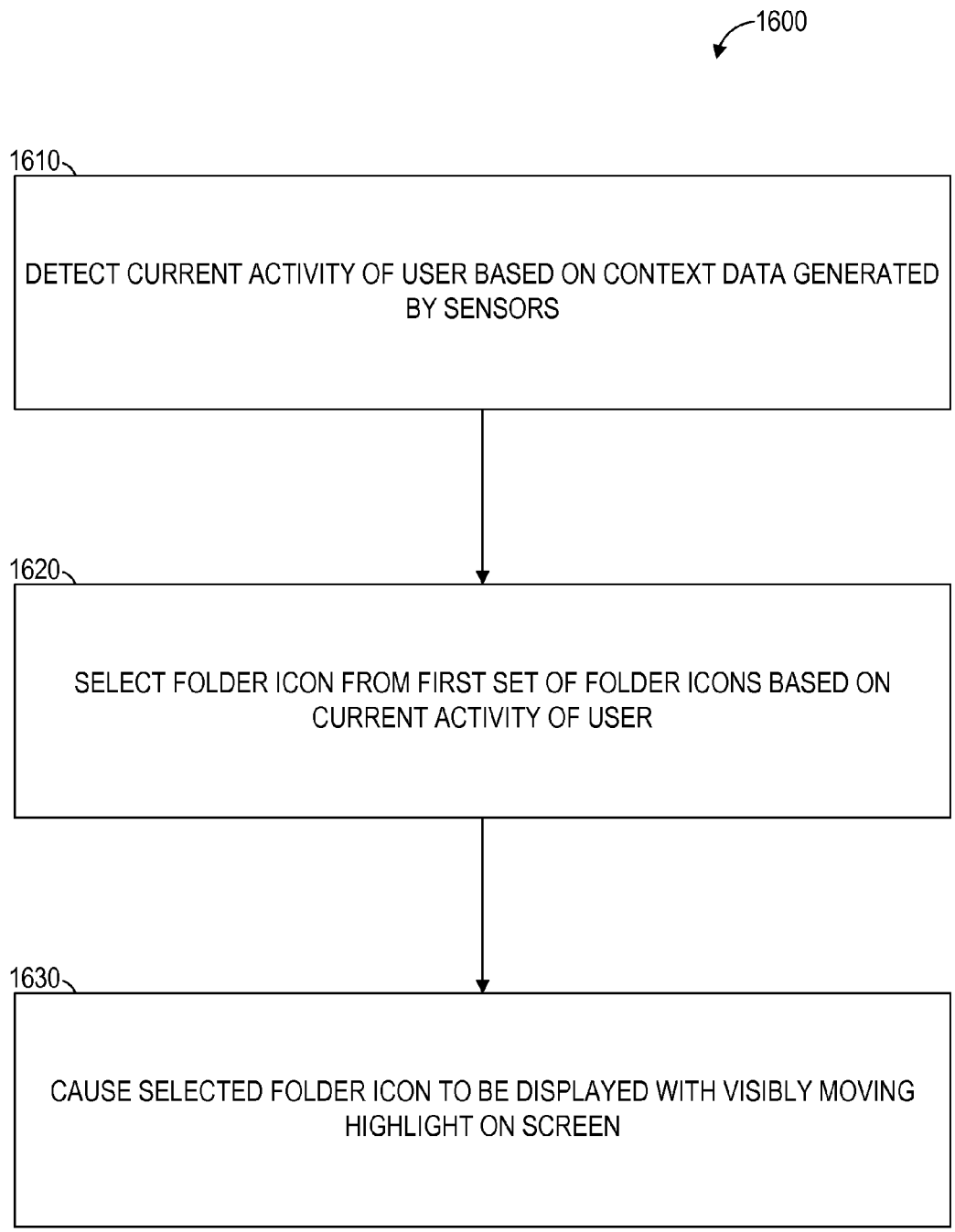
FIGS. 16-19 are flowcharts illustrating operations of the device in performing a method of generating icon animation based on detected activity, according to some example embodiments.

FIGS. 16-19 are flowcharts illustrating operations of the device 130 in performing a method 1600 of generating icon animation (e.g., one or more the icon animations depicted in FIGS. 4-15) based on detected activity, according to some example embodiments. Operations in the method 1600 may be performed by the device 130, using modules described above with respect to FIG. 2. As shown in FIG. 16, the method 1600 includes operations 1610, 1620, and 1630.

In operation 1610, the detection module 210 detects a current activity (e.g., a first activity) in which the user 132 is currently engaged. In many situations, the user 132 is performing the current activity without actively using the device 130 (e.g., driving a car from a current location toward a destination location, working in an office, dining at a restaurant, waiting at an airport, or listening to music at a friend's house). The detection of the current activity may be performed by determining an expected, predicted, inferred, or most likely activity in which the user 132 is currently engaged. Moreover, this detection may be fully or partially based on context data generated by one or more of the sensors 260 within the device 130. Such context data may be or include one or more types of sensor data gathered, determined, generated, or otherwise accessed by any of the sensors 260 (e.g., one or more indicators of location, orientation, altitude, acceleration, vibration, motion, temperature, light, sound, or any suitable combination thereof). In some example embodiments, the detection is further based on historical usage data stored by the device 130 (e.g., a log of activity data, such as a record of most frequently invoked applications among the applications 250). In certain example embodiments, the detection is further based on a preference of the user 132 (e.g., stored by the device 130 in a user-created or automatically created user profile that corresponds to the user 132).

In operation 1620, the icon module 220 selects an icon (e.g., icon 301, which may be a folder icon) from a first set of icons (e.g., folder icons) based on the current activity (e.g., the first activity) detected in operation 1610. Some or all of the first set of icons may already be displayed on the screen 290 of the device 130. For example, the icons 301, 302, and 303 (e.g., with or without additional icons that are displayed or not displayed on the screen 290) may form all or part of the first set of icons. The selection of the icon (e.g., icon 301) from the first set of icons may have the effect of designating the selected icon as an icon that is relevant (e.g., most relevant or most likely relevant), pertinent, linked, or otherwise appropriate for the detected current activity of the user 132. Accordingly, performance of operation 1620 may have the effect of automatically (e.g., by a machine, such as the device 130) and dynamically (e.g., in real time) identifying, selecting, choosing, specifying, or otherwise determining an icon (e.g., icon 301) as the selected icon, based on (e.g., in response to) the current activity of the user 132 (e.g., as detected in operation 1610).

In operation 1630, the icon module 220 causes the selected icon (e.g., icon 301) to be displayed on the screen 290 with an animation in the example form of a visibly moving highlight on, around, or near the selected icon. This may have the effect of applying the visibly moving highlight to the icon (e.g., icon 301) that was designated as relevant, pertinent (e.g., most pertinent or most likely pertinent), linked, or otherwise appropriate (e.g., most appropriate or most likely appropriate) for the detected current activity of the user 132. According to various example embodiments, the screen 290 displays the selected icon (e.g., icon 301) among (e.g., within) a second set of icons (e.g., folder icons) on the screen 290. For example, the icons 301-312 may constitute the second set of icons being displayed by the screen 290.

In some example embodiments, the visibly moving highlight is applied to only the selected icon (e.g., icon 301). However, in other example embodiments, the visibly moving highlight is applied to the selected icon and one or more additional icons (e.g., with a visibly different levels of intensity, for example, to indicate different levels of relevance, pertinence, linkage, or appropriateness). For example, the visibly moving highlight may be applied to at least the selected icon (e.g., icon 301) but fewer than all of the icons in the displayed second set of folder icons (e.g., applied to less than all of the icons 301-312).

As noted above, each icon in the displayed second set of icons may correspond to a different folder or application stored by the device 130. For example, each folder icon may correspond to a different folder stored by the device 130 and may be operable to cause contents of its corresponding folder to be presented on the screen 290 of the device 130. As another example, each application icon may correspond to a different application (e.g., one of the applications 250) stored by the device 130 and may be operable to cause the corresponding application to be executed (e.g., launch) on the device 130.

Figure 17:
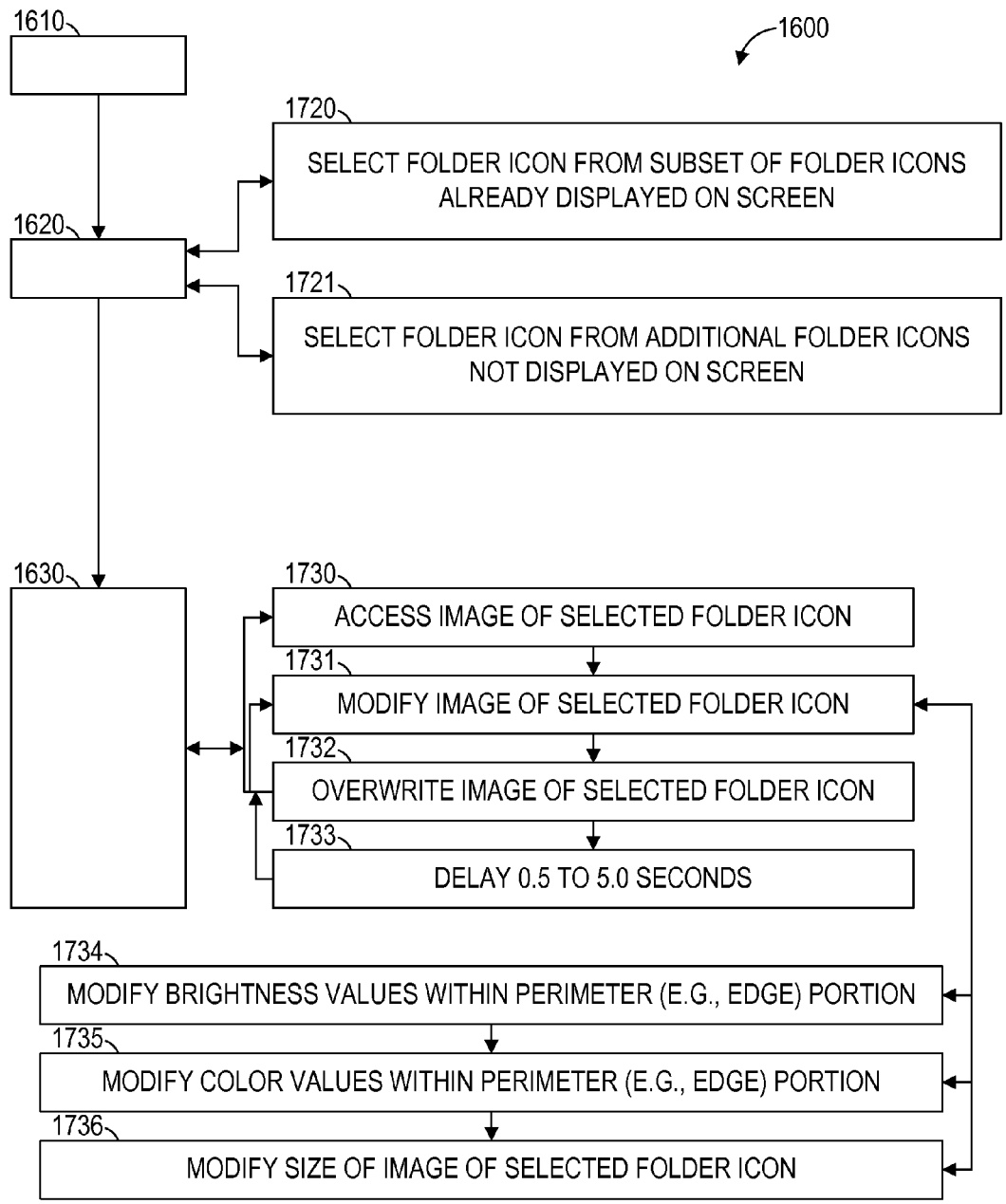

As shown in FIG. 17, various example embodiments of the method 1600 may include one or more of operations 1720, 1721, 1730, 1731, 1732, 1733, 1734, 1735, and 1736. In some example embodiments, operation 1720 may be performed as part (e.g., a precursor task, a subroutine, or a portion) of operation 1620, in which the icon module 220 selects the icon (e.g., icon 301) from the first set of icons. In operation 1720, the icon module 220 selects the icon from a subset of the icons 301-312 that are already displayed on the screen 290 of the device 130. That is, the first set of icons (e.g., from which the icon 301 is selected in operation 1620) may be a subset of the second set of icons (e.g., all of the icons displayed on the screen 290). Accordingly, the selection of the icon (e.g., icon 301) in operation 1620 may select the icon from those icons already displayed by the screen 290 (e.g., from among the icons 301-312).

In alternative example embodiments, operation 1721 is performed instead of operation 1720. Operation 1721 may be performed as part of operation 1620, in which the icon module 220 selects the icon (e.g., icon 301) from the first set of icons. In operation 1721, the icon module 220 selects the icon from a superset of the icons 301-312 that are already displayed on the screen 290 of the device 130. In other words, the first set of icons (e.g., from which the icon 301 is selected in operation 1620) may be a superset of the second set of icons (e.g., all of the icons displayed on the screen 290). Accordingly, the selection of the icon (e.g., icon 301) in operation 1620 may select the icon from one or more icons that are not being displayed by the screen 290 (e.g., from icons other than the icons 301-312).

In some example embodiments, the selected icon (e.g., icon 301) is or includes an image stored by the device 130 (e.g., stored as an image file), and the animation for the icon is generated, in whole or in part, by animating the image of the selected icon. That is, the visibly moving highlight may animate the selected icon (e.g., icon 301) by modifying the image of the selected icon. As depicted in FIG. 17, one or more of operations 1730, 1731, 1732, and 1733 may be performed as part of operation 1630, in which the icon module 220 causes the selected icon (e.g., icon 301) to be displayed with the animation (e.g., the visibly moving highlight) on the screen 290 of the device 130.

In operation 1730, the icon module 220 accesses the image of the selected icon (e.g., an image file that represents the icon 301). In operation 1731, the image of the selected icon is modified by the icon module 220. For example, the icon module 220 may modify one or more pixels of the image (e.g., by modifying the pixel's values for brightness, color hue, color saturation, transparency, layer, or any suitable combination thereof). In operation 1732, the icon module 220 overwrites the stored image of the selected icon with the modified image from performance of operation 1731.

In some example embodiments, the modifying and overwriting of the image (e.g., according to operations 1731 and 1732) is performed periodically or otherwise repeatedly. For example, the image may be cyclically modified and overwritten on a continual basis with a period in the range of 0.5 seconds to 5 seconds (e.g., in the range of 1 second to 3 seconds, such as 2 seconds). As shown in FIG. 17 by operation 1733, this may be accomplished by inserting a delay of 0.5 to 5 seconds (e.g., 0.5, 1, 2, 3, 4, or 5 seconds) into each cycle. This may have the effect of producing a pulsating, vibrating, quivering, or otherwise repeating effect that forms all or part of the visibly moving highlight being applied to the selected icon (e.g., icon 301). For example, the repeated modifying of the image may cause the screen 290 to depict an animated pulsating aura (e.g., a shining glow that slowly varies in intensity over time) on at least one outer boundary (e.g., one or more outer boundaries or edges, up to all outer boundaries or edges) of the selected icon (e.g., icon 301).

According to certain example embodiments, one or more of operations 1734, 1735, and 1736 may be performed as part of operation 1731, in which the icon module 220 modifies the image of the selected icon (e.g., icon 301). In operation 1734, the icon module 220 modifies one or more pixel brightness values (e.g., brightness values of one or more pixels) within a perimeter portion of the image. The perimeter portion is a portion of the image that includes at least part of an edge (e.g., outer edge or outer boundary) of the image and in some implementations may include the entire perimeter (e.g., but not the center) of the image. Hence, the perimeter portion of the image may be referred to as an edge portion of the image. According to certain example embodiments, the modifying of the pixel brightness values in operation 1734 may be performed while maintaining a size of the image of the selected icon (e.g., icon 301). That is, the overall dimensions (e.g., height and width) of the image may remain the same while the perimeter portion is being modified. In alternative example embodiments, the size of the image is not held constant, but is increased or decreased (e.g., in height, width, or both) during the modification of the image in operation 1731.

In operation 1735, the icon module 220 modifies one or more pixel color values (e.g., hue values, saturation values, or both, for one or more pixels) within a perimeter portion (e.g., edge portion) of the image. As noted above, the perimeter portion is a portion of the image that includes at least part of an edge (e.g., outer edge or outer boundary) of the image and in some implementations may include the entire perimeter (e.g., but not the center) of the image. According to certain example embodiments, the modifying of the pixel color values in operation 1735 may be performed while maintaining a size of the image of the selected icon (e.g., icon 301). That is, as noted above, the overall dimensions (e.g., height and width) of the image may remain the same while the perimeter portion is being modified. In alternative example embodiments, as also noted above, the size of the image is not held constant, but is increased or decreased (e.g., in height, width, or both) during the modification of the image in operation 1731.

In the example embodiments in which the size of the image is not held constant, operation 1736 may be performed by the icon module 220 to modify the size of the image of the selected icon (e.g., icon 301). For example, the icon module 220 may adjust (e.g., increase or decrease) one or more dimensions of the image, such as, height, width, or both. Since the image may be cyclically modified and overwritten on a continual (e.g., ongoing) basis, repeated performance of operation 1736 may have the effect of causing the image to shrink and grow in a pulsating, vibrating, quivering, or otherwise repeating manner.

Figure 18:
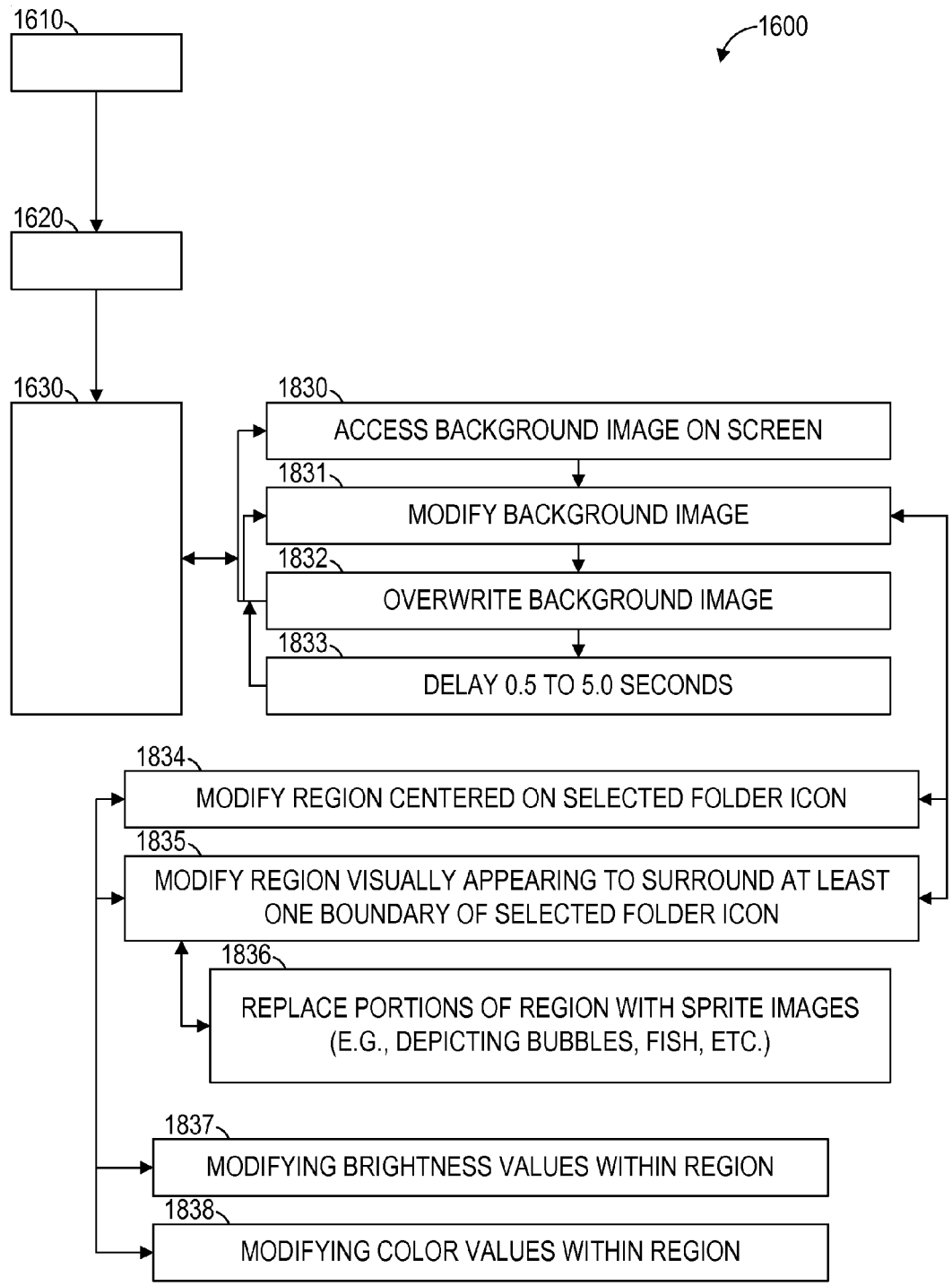

As shown in FIG. 18, various example embodiments of the method 1600 may include one or more of operations 1830, 1831, 1832, 1833, 1834, 1835, 1836, 1837, and 1838. In some example embodiments, the animation for the selected icon (e.g., icon 301) is generated, in whole or in part, by modifying the background image 300 (e.g., stored as an image file on the device 130) that is being displayed on the screen 290 of the device 130. That is, the visibly moving highlight may provide one or more animated effects around or near the selected icon by modifying the background image 300. As depicted in FIG. 18, one or more of operations 1830, 1831, 1832, and 1833 may be performed as part of operation 1630, in which the icon module 220 causes the selected icon (e.g., icon 301) to be displayed with the animation (e.g., the visibly moving highlight) on the screen 290 of the device 130.

In operation 1830, the icon module 220 accesses the background image 300 (e.g., an image file that defines the background image 300). In operation 1831, the background image 300 is modified by the icon module 220. For example, the icon module 220 may modify one or more pixels of the background image 300 (e.g., by modifying the pixel's values for brightness, color hue, color saturation, transparency, layer, or any suitable combination thereof). In operation 1832, the icon module 220 overwrites the stored version of the background image 300 with the modified version of the background image 300 from performance of operation 1831.

In some example embodiments, the modifying and overwriting of the background image 300 (e.g., according to operations 1831 and 1832) is performed periodically or otherwise repeatedly. For example, the background image 300 may be cyclically modified and overwritten on a continual basis with a period in the range of 0.5 seconds to 5 seconds (e.g., in the range of 1 second to 3 seconds, such as 2 seconds). As shown in FIG. 18 by operation 1833, this may be accomplished by inserting a delay of 0.5 to 5 seconds (e.g., 0.5, 1, 2, 3, 4, or 5 seconds) into each cycle. This may have the effect of producing a pulsating, vibrating, quivering, or otherwise repeating effect that forms all or part of the visibly moving highlight being applied to the selected icon (e.g., icon 301).

According to certain example embodiments, one or more of operations 1834, 1835, 1736, 1836, 1837, and 1838 may be performed as part of operation 1831, in which the icon module 220 modifies the background image 300. In operation 1834, the icon module 220 modifies a region of the background image 300. In example embodiments that include operation 1834, the region is centered on the selected icon (e.g., centered on a reference point of icon 301 or centered on a location at which the icon 301 is located and displayed within the screen 290). In some example embodiments, the region centered on a geometric centroid of an image of the selected icon (e.g., icon 301).

In operation 1835, the icon module 220 modifies the region of the background image 300. However, in example embodiments that include operation 1835, the region that visually appears to surround at least one boundary of the selected icon (e.g., one outer boundary or outer edge of an image of the icon 301). Generally, the region includes one or more pixels of the background image 300 that are adjacent to at least one outer boundary (e.g., at least one outer edge) of an image of the selected icon (e.g., icon 301). In some implementations, the region of the background image 300 encompasses the entire perimeter (e.g., all outer boundaries) of the image of the selected icon (e.g., icon 301). For example, the region may extend a predetermined number of pixels away from the selected icon (e.g., 20, 50, or 100 pixels away from the image of the icon 301), along one or more outer edges of the selected icon. As noted above, the selected icon may be superimposed over the background image 300 on the screen 290.

As shown in FIG. 18, operation 1836 may be performed as part of operation 1835. Although not drawn in FIG. 18 for clarity, operation 1836 may also be performed as part of operation 1834. In operation 1836, the region of the background image 300 is modified by replacing one or more portions of the region with one or more sprite images (e.g., one or more image sprites). As used herein, a "sprite image" is a sub-image within an image (e.g., a small partial image included in a larger image).

In some example embodiments that include operation 1836, a sprite image may depict a bubble (e.g., a circular or spherical bubble), and one or more of such sprite images may be included in the generated animation (e.g., the visibly moving highlight) to depict animated bubbles emanating and rising from the selected icon (e.g., icon 301) within the region of the background image 300.

In certain example embodiments that include operation 1836, a sprite image may depict a fish (e.g., a photorealistic fish or a cartoon fish), and one or more of such sprite images may be included in the generated animation (e.g., the visibly moving highlight) to depict animated fish swimming within the region of the background image 300.

In various example embodiments that include operation 1836, one or more sprite images may depict colored lines, ripples (e.g., on a liquid surface), bubbles, fish, clouds, bees, butterflies, or other objects. Accordingly, such sprite images may be included in the generated animation (e.g., the visibly moving highlight) to depict any combination of such objects moving (e.g., swirling or dancing) within the region of the background image 300.

Each of operations 1834 and 1835 may include one or more of operations 1837 and 1838. In operation 1837, which may be performed by the icon module 220, the modifying of the region of the background image 300 includes modifying one or more pixel brightness values (e.g., brightness values of one or pixels) within the region of the background image 300. In operation 1838, which may also be performed by the icon module 220, the modifying of the region of the background image 300 includes modifying one or more pixel color values (e.g., hue values, saturation values, or both, for one or more pixels) within the region of the background image 300.

Figure 19:
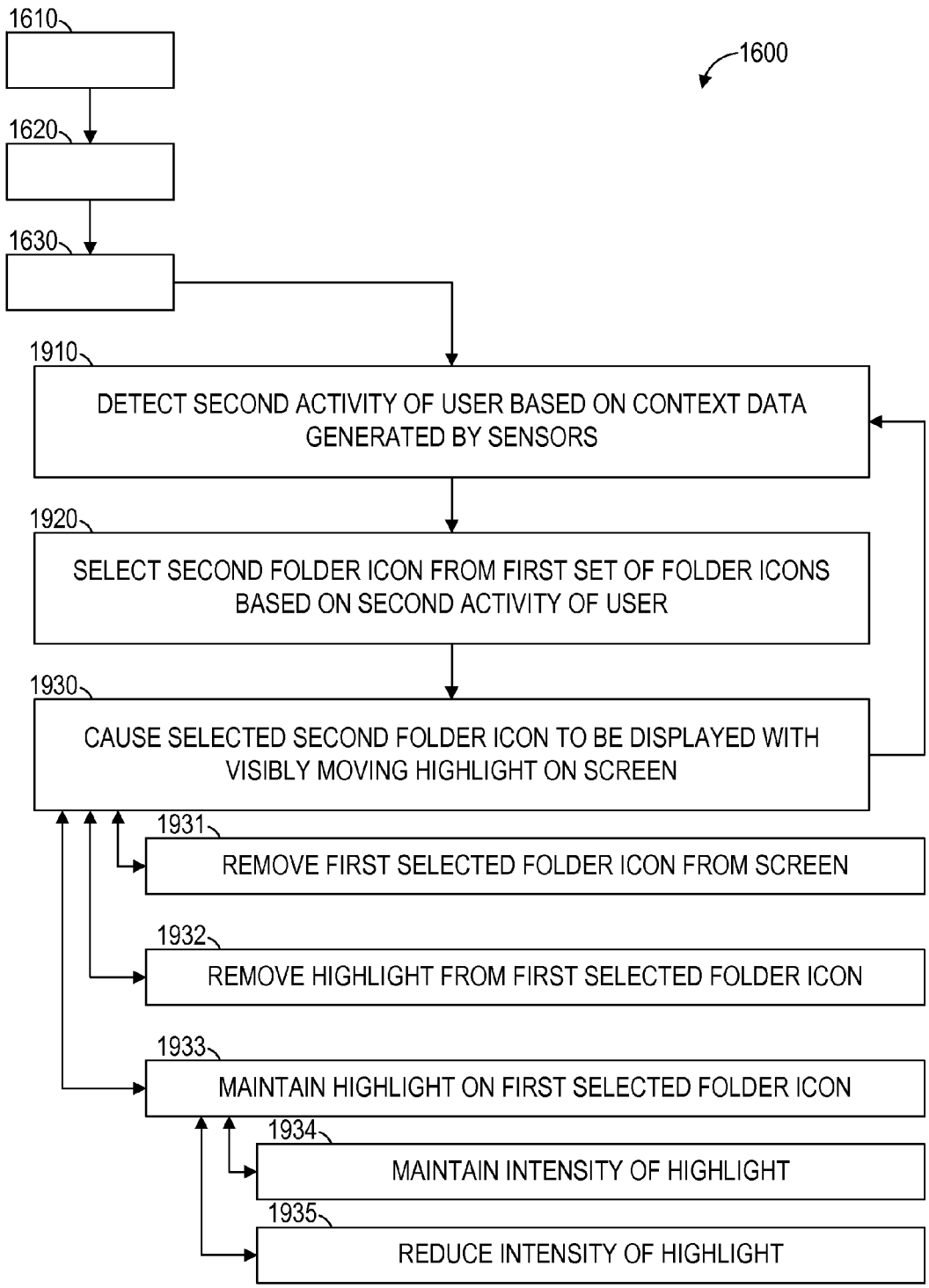

As shown in FIG. 19, various example embodiments of the method 1600 may include one or more of operations 1910, 1920, and 1930. In the example embodiments depicted in FIG. 19, the detecting of the current activity in operation 1610 detects a first activity in which the user 132 is engaged approximately at or around the time operation 1610 is performed (e.g., starting to drive from a first location to a second location, such as when traveling from home to a restaurant or a workplace). Accordingly, the icon selected in operation 1620 (e.g., icon 301) may be considered as a first selected icon that is determined by the icon module 220 to be relevant, pertinent, linked, or otherwise appropriate for the first activity. The device 130 may be configured to repeatedly (e.g., periodically or continuously) detect activities of the user 132 as these activities change over time and update screen 290 of the device 130 by shifting the generated animation (e.g., the visibly moving highlight) from icon to icon (e.g., from icon 301 to icon 305), in response to new activities being detected. Thus, according to the example embodiments depicted in FIG. 19, operations 1910, 1920, and 1930 may be performed multiple times (e.g., in a cyclical, periodic, or otherwise repeated fashion).

In operation 1910, the detection module 210 detects a second activity (e.g., as the current activity of the user 132) in which the user 132 is currently engaged. This detection may be performed in a manner similar to that described above for operation 1610, including any one or more of the details described above for operation 1610. For example, the detection of the second activity may be performed by determining an expected, predicted, inferred, or most likely activity in which the user 132 is presently engaged approximately at or around the time operation 1910 is performed (e.g., finishing a drive from a first location to a second location, such as when approaching a restaurant or a workplace). As noted above, this detection may be fully or partially based on context data generated by one or more of the sensors 260 within the device 130. In some example embodiments, the detection is further based on historical usage data stored by the device 130 (e.g., a log of activity data, such as a record of most frequently invoked applications among the applications 250). In certain example embodiments, the detection is further based on a preference of the user 132 (e.g., stored by the device 130 in a user-created or automatically created user profile that corresponds to the user 132).

In operation 1920, the icon module 220 selects another icon (e.g., icon 305, which may be a folder icon) from the first set of icons (e.g., folder icons) based on the second activity that was detected in operation 1910. This selection may be performed in a manner similar to that described above for operation 1620, including any one or more of the details described above for operation 1620. For example, the selection of the icon (e.g., icon 305) in operation 1920 may have the effect of designating the selected icon as a second selected icon that is relevant (e.g., most relevant or most likely relevant), pertinent, linked, or otherwise appropriate for the detected second activity of the user 132. Accordingly, performance of operation 1920 may have the effect of automatically (e.g., by a machine, such as the device 130)

and dynamically (e.g., in real time) identifying, selecting, choosing, specifying, or otherwise determining an icon (e.g., icon 305) as a second selected icon, based on (e.g., in response to) the second activity of the user 132 (e.g., as detected in operation 1910).

In operation 1930, the icon module 220 causes the second selected icon (e.g., icon 305) to be displayed on the screen 290 with the generated animation (e.g., the visibly moving highlight) on, around, or near the second selected icon (e.g., icon 305). Operation 1930 may be performed in a manner similar to that described above for operation 1630, including any one or more of the details described above for operation 1630. For example, performance of operation 1930 may have the effect of moving (e.g., shifting) the visibly moving highlight to the second selected icon (e.g., icon 305) that was designated as relevant, pertinent, linked, or otherwise appropriate for the detected second activity of the user 132.

In some example embodiments, operation 1931 is performed as part of operation 1930. In other example embodiments, operation 1932 is performed as part of operation 1930. In still other example embodiments, operation 1933 is performed as part of operation 1930.

In operation 1931, as part of causing the second selected icon (e.g., icon 305) to be displayed with the generated animation (e.g., the visibly moving highlight) on the screen 290, the icon module 220 removes the first selected icon (e.g., icon 301) from the screen 290. This may have the effect of indicating to the user 132 that the removed icon is not relevant, pertinent, linked, or otherwise appropriate for the detected second activity of the user 132.

In operation 1932, as part of causing the second selected icon (e.g., icon 305) to be displayed with the generated animation (e.g., the visibly moving highlight) on the screen 290, the icon module 220 removes the generated animation from the first selected folder icon (e.g., icon 301). This may be performed by maintaining display of the first selected icon (e.g., icon 301) but without the visibly moving highlight previously applied to the first selected icon (e.g., icon 301).

In operation 1933, as part of causing the second selected icon (e.g., icon 305) to be displayed with the generated animation (e.g., the visibly moving highlight) on the screen 290, the icon module 220 maintains display of the first selected icon (e.g., icon 301) on the screen 290 of the device 130. This may be performed with or without a reduction in the intensity of the generated animation (e.g., with and without a reduction in the intensity of the visibly moving highlight). These two situations are handled by operations 1934 and 1935, either of which may be included as part of operation 1933.

In operation 1934, the intensity of the generated animation is maintained by the icon module 220. This may have the effect of maintaining the display of the first selected icon (e.g., icon 301) with the same visibly moving highlight that is being applied to the second selected icon (e.g., icon 305) in operation 1933. Accordingly, not only is the second selected icon (e.g., icon 305) being animated (e.g., highlighted) based on the second activity of the user 132, the previously selected icon (e.g., icon 301) remains animated with the same animation (e.g., to indicate prior relevance, pertinence, linkage, or appropriateness).

In operation 1935, the intensity of the generated animation is reduced by the icon module 220. The reduction in intensity may include a reduction in pixel brightness values, a reduction in pixel color values (e.g., hue values, saturation values, or both), a reduction in frequency of repetition (e.g., an increase in repetition period), or any suitable combination thereof. Thus, the second selected icon (e.g., icon 305) may be animated (e.g., highlighted) with a full intensity version of the visibly moving highlight, while the previously selected icon (e.g., icon 301) remains animated somewhat, but with a reduced intensity version of the visibly moving highlight (e.g., to indicate prior or lessened relevance, pertinence, linkage, or appropriateness).

According to various example embodiments, one or more of the methodologies described herein may facilitate generating, providing, or otherwise facilitating icon animation based on detected activity, including generating and displaying various graphical elements for display on the screen 290 of the device 130 (e.g., as shown and described with respect to FIGS. 4-15). Thus, one or more of the methodologies described herein may facilitate quick and convenient identification of, and activation of, one or more icons relevant to a detected current activity of the user 132. Moreover, one or more of the methodologies described herein may facilitate access to, and invocation of, one or more folders, applications, or both, from the screen 290 of the device 130. Hence, one or more of the methodologies described herein may facilitate faster, simpler, more relevant, more convenient, and more satisfying usage of the device 130 compared to devices that lack the modules described herein or otherwise are unable to perform the methodologies described herein.

When these effects are considered in aggregate, one or more of the methodologies described herein may obviate a need for certain efforts or resources that otherwise would be involved in facilitating icon animation based on detected activity or facilitating the faster, simpler, more relevant, more convenient, and more satisfying usage of the device 130. Efforts expended by a user in accessing and invoking applications on the device 130 may be reduced by use of (e.g., reliance upon) a machine (e.g., device 130) that implements one or more of the methodologies described herein. Computing resources used by one or more machines, databases, or devices (e.g., within the network environment 100) may similarly be reduced (e.g., compared to machines, databases, or devices that lack one or more the methodologies described herein). Examples of such computing resources include processor cycles, network traffic, memory usage, data storage capacity, power consumption, and cooling capacity.

Figure 20:
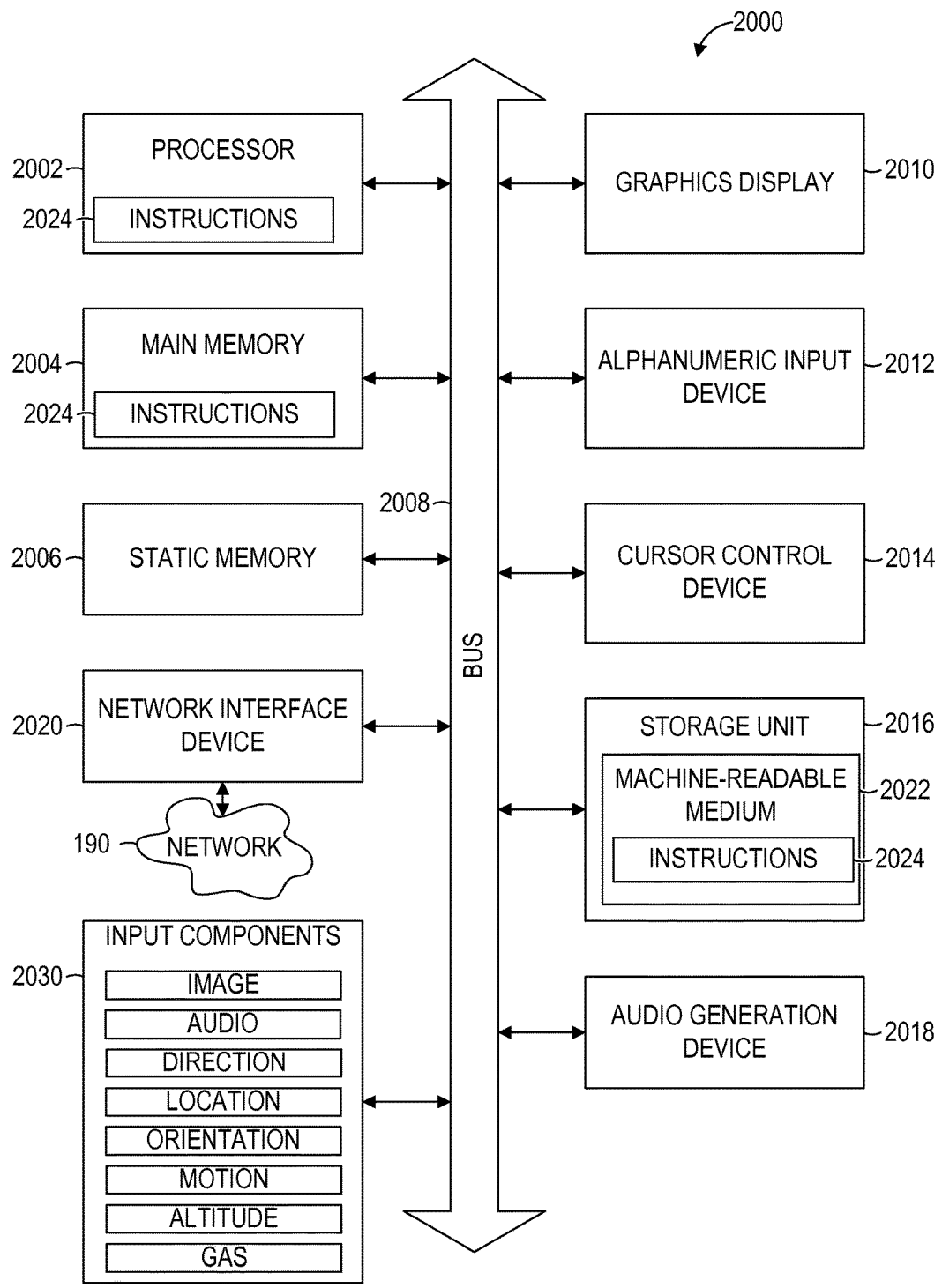
FIG. 20 is a block diagram illustrating components of a machine (e.g., the device), according to some example embodiments, able to read instructions from a machine-readable medium and perform any one or more of the methodologies discussed herein.

FIG. 20 is a block diagram illustrating components of a machine 2000, according to some example embodiments, able to read instructions 2024 from a machine-readable medium 2022 (e.g., a non-transitory machine-readable medium, a machine-readable storage medium, a computer-readable storage medium, or any suitable combination thereof) and perform any one or more of the methodologies discussed herein, in whole or in part. Specifically, FIG. 20 shows the machine 2000 in the example form of a computer system (e.g., a computer) within which the instructions 2024 (e.g., software, a program, an application, an applet, an app, or other executable code) for causing the machine 2000 to perform any one or more of the methodologies discussed herein may be executed, in whole or in part.

In alternative embodiments, the machine 2000 operates as a standalone device or may be communicatively coupled (e.g., networked) to other machines. In a networked deployment, the machine 2000 may operate in the capacity of a server machine or a client machine in a server-client network environment, or as a peer machine in a distributed (e.g., peer-to-peer) network environment. The machine 2000 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 2024, sequentially or otherwise, that specify actions to be taken by that machine. Further, while only a single machine is illustrated, the term "machine" shall also be taken to include any collection of machines that individually or jointly execute the instructions 2024 to perform all or part of any one or more of the methodologies discussed herein.

The machine 2000 includes a processor 2002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 2004, and a static memory 2006, which are configured to communicate with each other via a bus 2008. The processor 2002 may contain solid-state digital microcircuits (e.g., electronic, optical, or both) that are configurable, temporarily or permanently, by some or all of the instructions 2024 such that the processor 2002 is configurable to perform any one or more of the methodologies described herein, in whole or in part. For example, a set of one or more microcircuits of the processor 2002 may be configurable to execute one or more modules (e.g., software modules) described herein. In some example embodiments, the processor 1102 is a multicore CPU (e.g., a dual-core CPU, a quad-core CPU, or a 128-core CPU) within which each of multiple cores is a separate processor that is able to perform any one or more of the methodologies discussed herein, in whole or in part. Although the beneficial effects described herein may be provided by the machine 2000 with at least the processor 2002, these same effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 2000 may further include a graphics display 2010 (e.g., a plasma display panel (PDP), a light emitting diode (LED) display, a liquid crystal display (LCD), a projector, a cathode ray tube (CRT), or any other display capable of displaying graphics or video). The machine 2000 may also include an alphanumeric input device 2012 (e.g., a keyboard or keypad), a cursor control device 2014 (e.g., a mouse, a touchpad, a trackball, a joystick, a motion sensor, an eye tracking device, or other pointing instrument), a storage unit 2016, an audio generation device 2018 (e.g., a sound card, an amplifier, a speaker, a headphone jack, or any suitable combination thereof), and a network interface device 2020.

The storage unit 2016 includes the machine-readable medium 2022 (e.g., a tangible and non-transitory machine-readable storage medium) on which are stored the instructions 2024 embodying any one or more of the methodologies or functions described herein. The instructions 2024 may also reside, completely or at least partially, within the main memory 2004, within the processor 2002 (e.g., within the processor's cache memory), or both, before or during execution thereof by the machine 2000. Accordingly, the main memory 2004 and the processor 2002 may be considered machine-readable media (e.g., tangible and non-transitory machine-readable media). The instructions 2024 may be transmitted or received over the network 190 via the network interface device 2020. For example, the network interface device 2020 may communicate the instructions 2024 using any one or more transfer protocols (e.g., hypertext transfer protocol (HTTP)).

In some example embodiments, the machine 2000 may be a portable computing device, such as a smart phone or tablet computer, and have one or more additional input components 2030 (e.g., sensors or gauges). Examples of such input components 2030 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 2022 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 2024 for execution by the machine 2000, such that the instructions 2024, when executed by one or more processors of the machine 2000 (e.g., processor 2002), cause the machine 2000 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 2024 for execution by the machine 2000 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 2024).

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a CPU or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a CPU configured by software to become a special-purpose processor, the CPU may be configured as respectively different special-purpose processors (e.g., each included in a different hardware module) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. Accordingly, the operations described herein may be at least partially processor-implemented, since a processor is an example of hardware. For example, at least some operations of any method may be performed by one or more processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated embodiments describe various example embodiments of methods, machine-readable media, and systems (e.g., a device or other machine) discussed herein.

A first embodiment provides a method comprising:
by a detection module comprising one or more processors of a device, detecting a current activity in which a user of the device is engaged, the detecting of the current activity being based on context data generated by a set of sensors within the device; and
by an icon module comprising one or more processors of the device:
selecting a folder icon from a first set of folder icons based on the current activity of the user; and
causing the selected folder icon from the first set of folder icons to be displayed with a visibly moving highlight on a screen of the device, the screen of the device displaying the selected folder icon within a second set of folder icons being displayed by the screen, the visibly moving highlight being applied to at least the selected folder icon but fewer than all folder icons in the displayed second set of folder icons, each folder icon in the displayed second set of folder icons corresponding to a different folder among a plurality of folders stored by the device, each folder icon in the displayed second set of folder icons being operable to cause contents of its corresponding folder to be presented on the screen of the device.

A second embodiment provides a method according to the first embodiment, wherein:
the first set of folder icons from which the folder icon is selected based on the current activity of the user is a subset of the second set of folder icons being displayed by the screen; and
the selecting of the folder icon selects a folder icon that is being displayed by the screen.

A third embodiment provides a method according to the first embodiment, wherein:
the first set of folder icons from which the folder icon is selected based on the current activity of the user is a superset of the second set of folder icons being displayed by the screen; and
the selecting of the folder icon selects a folder icon that is not being displayed by the screen.

A fourth embodiment provides a method according to any of the first through third embodiments, wherein:
the selected folder icon includes an image stored by the device;
the visibly moving highlight animates the selected folder icon; and
the causing of the selected folder icon to be displayed with the visibly moving highlight on the screen of the device includes, cyclically:
accessing the image of the selected folder icon;
modifying the image of the selected folder icon; and
overwriting the image of the selected folder icon.

A fifth embodiment provides a method according to the fourth embodiment, wherein:
the modifying of the image of the selected folder icon is performed periodically with a period in the range of 0.5 seconds to 5 seconds.

A sixth embodiment provides a method according to the fourth embodiment or the fifth embodiment, wherein:
the modifying of the image of the selected folder icon includes modifying brightness values of pixels within a perimeter portion of the selected folder icon while maintaining a size of the image of the selected folder icon, the perimeter portion including at least one outer boundary of the select folder icon.

A seventh embodiment provides a method according to any of the fourth through sixth embodiments, wherein:
the modifying of the image of the selected folder icon includes modifying color values of pixels within a perimeter portion of the selected folder icon while maintaining a size of the image of the selected folder icon, the perimeter portion including at least one outer boundary of the selected folder icon.

An eighth embodiment provides a method according any of the fourth through seventh embodiments, wherein:
the modifying of the image of the selected folder icon includes modifying a size of the image of the selected folder icon.

A ninth embodiment provides a method according to any of the first through eighth embodiments, wherein:
the screen of the device displays the second set of folder icons superimposed over a background image stored by the device;
the visibly moving highlight animates the background image; and
the causing of the selected folder icon to be displayed with the visibly moving highlight on the screen of the device includes, cyclically:
accessing the background image stored by the device;
modifying the background image; and
overwriting the background image on the device.

A tenth embodiment provides a method according to the ninth embodiment, wherein:
the modifying of the background image is performed periodically with a period in the range of 0.5 seconds to 5 seconds.

An eleventh embodiment provides a method according to the ninth embodiment or the tenth embodiment, wherein:
the modifying the background image modifies a region of the background image, the modified region of the background image being centered on a location on the screen at which the selected folder icon is displayed.

A twelfth embodiment provides a method according to any of the ninth through eleventh embodiments, wherein:
the modifying of the background image includes modifying a region of the background image, the modified region visually appearing to surround at least one outer boundary of the selected folder icon superimposed over the background image.

A thirteenth embodiment provides a method according to the twelfth embodiment, wherein:
the modifying of the region of the background image includes modifying brightness values of pixels within the region that visually appears to surround at least one outer boundary of the selected folder icon.

A fourteenth embodiment provides a method according to the twelfth embodiment or the thirteenth embodiment, wherein:
the modifying of the region of the background image includes modifying color values of pixels within the region that visually appears to surround at least one outer boundary of the selected folder icon.

A fifteenth embodiment provides a method according to any of the first through fourteenth embodiments, wherein:

the detecting of the current activity detects a first activity, and the selected folder icon is a first selected folder icon determined by the icon module to be relevant to the first activity; and the method further comprises:

by the detection module, detecting a second activity in which the user is engaged after cessation of the first activity, the detecting of the second activity being based on further context data generated by the set of sensors within the device;

by the icon module, selecting a second folder icons from the first set of folder icons based on the second activity of the user; and by the icon module, causing the second selected folder icon to be displayed with the visibly moving highlight on the screen.

A sixteenth embodiment provides a method according to the fifteenth embodiment, wherein:

the causing of the second selected folder icon to be displayed with the visibly moving highlight on the screen includes maintaining display of the first selected folder icon on the screen with the visibly moving highlight.

A seventeenth embodiment provides a method according to the fifteenth embodiment, wherein:

the causing of the second selected folder icon to be displayed with the visibly moving highlight on the screen includes maintaining display of the first selected folder icon on the screen but with a reduced intensity version of the visibly moving highlight, the reduced intensity version being reduced in at least one of brightness values, color saturation values, or frequency of repetition relative to the visibly moving highlight applied to the second selected folder icon.

An eighteenth embodiment provides a method according to the fifteenth embodiment, wherein:

the causing of the second selected folder icon to be displayed with the visibly moving highlight on the screen includes maintaining display of the first selected folder icon on the screen but without the visibly moving highlight.

A nineteenth embodiment provides a method according to the fifteenth embodiment, wherein:

the causing of the second selected folder icon to be displayed with the visibly moving highlight on the screen includes removing the first selected folder icon from the screen.

A twentieth embodiment provides a machine-readable medium (e.g., a non-transitory machine-readable storage medium) comprising instructions that, when executed by one or more processors of a device, cause the device to perform operations comprising:

by a detection module comprising one or more processors of a device, detecting a current activity in which a user of the device is engaged, the detecting of the current activity being based on context data generated by a set of sensors within the device; and by an icon module comprising one or more processors of the device:

selecting a folder icon from a first set of folder icons based on the current activity of the user; and causing the selected folder icon from the first set of folder icons to be displayed with a visibly moving highlight on a screen of the device, the screen of the device displaying the selected folder icon within a second set of folder icons being displayed by the screen, the visibly moving highlight being applied to at least the selected folder icon but fewer than all folder icons in the displayed second set of folder icons, each folder icon in the displayed second set of folder icons corresponding to a different folder among a plurality of folders stored by the device, each folder icon in the displayed second set of folder icons being operable to cause contents of its corresponding folder to be presented on the screen of the device.

A twenty first embodiment provides a machine-readable medium according to the twentieth embodiment, wherein:

the causing of the selected folder icon to be displayed with the visibly moving highlight on the screen of the device includes at least one of:

repeatedly modifying pixels that form at least one outer edge of an image of the selected folder icon, or repeatedly modifying pixels of a background image over which the image of the selected folder icon appears superimposed, the modified pixels of the background image being adjacent to at least one outer edge of the image of the selected folder icon.

A twenty second embodiment provides a machine-readable medium according to the twenty first embodiment, wherein:

the repeated modifying of the pixels causes the screen to depict an animated pulsating aura on at least one outer boundary of the selected folder icon.

A twenty third embodiment provides a machine-readable medium according to the any of the twentieth through twenty second embodiments, wherein:

the causing of the selected folder icon to be displayed with the visibly moving highlight on the screen of the device includes repeatedly modifying a background image over which the image of the selected folder icon is superimposed, the background image being modified by replacing portions of the background image in a region centered on the selected folder icon with sprite images.

A twenty fourth embodiment provides a machine-readable medium according to the twenty third embodiment, wherein:

the sprite images that replace the portions of the background image cause the screen to depict animated bubbles emanating and rising from the selected folder icon within the region centered on the selected folder icon.

A twenty fifth embodiment provides a machine-readable medium according to the twenty third embodiment or the twenty fourth embodiment, wherein:

the sprite images that replace the portions of the background image cause the screen to depict animated fish swimming within the region centered on the selected folder icon.

A twenty sixth embodiment provides a device comprising:

a detection module comprising one or more processors of the device and configured to detect a current activity in which a user of the device is engaged, the detecting of the current activity being based on context data generated by a set of sensors within the device; and an icon module comprising one or more processors of the device and configured to:

select a folder icon from a first set of folder icons based on the current activity of the user; and cause the selected folder icon from the first set of folder icons to be displayed with a visibly moving highlight on a screen of the device, the screen of the device displaying the selected folder icon within a second set of folder icons being displayed by the screen, the visibly moving highlight being applied to at least the selected folder icon but fewer than all folder icons in the displayed second set of folder icons, each folder icon in the displayed second set of folder icons corresponding to a different folder among a plurality of folders stored by the device, each folder icon in the displayed second set of folder icons being operable to cause contents of its corresponding folder to be presented on the screen of the device.

A twenty seventh embodiment provides a carrier medium carrying machine-readable instructions for controlling a machine to carry out the method of any one of the previously described embodiments.

What is claimed is:

1. A method comprising:
by a detection module comprising one or more processors of a device, detecting a current activity in which a user of the device is engaged, the detecting of the current activity being based on context data generated by a set of sensors within the device; and
by an icon module comprising one or more processors of the device:
selecting a folder icon from a first set of folder icons based on the current activity of the user; and
causing the selected folder icon from the first set of folder icons to be displayed with a visibly moving highlight on a screen of the device by repeatedly modifying a background image over which an image of the selected folder icon is superimposed, the background image being modified by replacing portions of the background image in a region centered on the selected folder icon with sprite images, the screen of the device displaying the selected folder icon within a second set of folder icons being displayed by the screen, the visibly moving highlight being applied to at least the selected folder icon but fewer than all folder icons in the displayed second set of folder icons, each folder icon in the displayed second set of folder icons corresponding to a different folder among a plurality of folders stored by the device, each folder icon in the displayed second set of folder icons being operable to cause contents of its corresponding folder to be presented on the screen of the device.

2. The method of claim 1, wherein:
the first set of folder icons from which the folder icon is selected based on the current activity of the user is a subset of the second set of folder icons being displayed by the screen; and
the selecting of the folder icon selects a folder icon that is being displayed by the screen.

3. The method of claim 1, wherein:
the first set of folder icons from which the folder icon is selected based on the current activity of the user is a superset of the second set of folder icons being displayed by the screen; and
the selecting of the folder icon selects a folder icon that is not being displayed by the screen.

4. The method of claim 1, wherein:
the selected folder icon includes an image stored by the device;
the visibly moving highlight animates the selected folder icon; and
the causing of the selected folder icon to be displayed with the visibly moving highlight on the screen of the device includes, cyclically:
accessing the image of the selected folder icon;
modifying the image of the selected folder icon; and
overwriting the image of the selected folder icon.

5. The method of claim 4, wherein:
the modifying of the image of the selected folder icon is performed periodically with a period in the range of 0.5 seconds to 5 seconds.

6. The method of claim 4, wherein:
the modifying of the image of the selected folder icon includes modifying brightness values of pixels within a perimeter portion of the selected folder icon while maintaining a size of the image of the selected folder icon, the perimeter portion including at least one outer boundary of the select folder icon.

7. The method of claim 4, wherein:
the modifying of the image of the selected folder icon includes modifying color values of pixels within a perimeter portion of the selected folder icon while maintaining a size of the image of the selected folder icon, the perimeter portion including at least one outer boundary of the selected folder icon.

8. The method of claim 4, wherein:
the modifying of the image of the selected folder icon includes modifying a size of the image of the selected folder icon.

9. The method of claim 1, wherein:
the screen of the device displays the second set of folder icons superimposed over a background image stored by the device;
the visibly moving highlight animates the background image; and
the causing of the selected folder icon to be displayed with the visibly moving highlight on the screen of the device includes, cyclically:
accessing the background image stored by the device;
modifying the background image; and
overwriting the background image on the device.

10. The method of claim 9, wherein:
the modifying of the background image is performed periodically with a period in the range of 0.5 seconds to 5 seconds.

11. The method of claim 9, wherein:
the modifying the background image modifies a region of the background image, the modified region of the background image being centered on a location on the screen at which the selected folder icon is displayed.

12. The method of claim 9, wherein:
the modifying of the background image includes modifying a region of the background image, the modified region visually appearing to surround at least one outer boundary of the selected folder icon superimposed over the background image.

13. The method of claim 12, wherein:
the modifying of the region of the background image includes modifying brightness values of pixels within the region that visually appears to surround at least one outer boundary of the selected folder icon.

14. The method of claim 12, wherein:
the modifying of the region of the background image includes modifying color values of pixels within the region that visually appears to surround at least one outer boundary of the selected folder icon.

15. The method of claim 1, wherein:
the detecting of the current activity detects a first activity, and the selected folder icon is a first selected folder icon determined by the icon module to be relevant to the first activity; and
the method further comprises:
by the detection module, detecting a second activity in which the user is engaged after cessation of the first activity, the detecting of the second activity being based on further context data generated by the set of sensors within the device;

by the icon module, selecting a second folder icons from the first set of folder icons based on the second activity of the user; and by the icon module, causing the second selected folder icon to be displayed with the visibly moving highlight on the screen.

16. The method of claim 15, wherein:
the causing of the second selected folder icon to be displayed with the visibly moving highlight on the screen includes maintaining display of the first selected folder icon on the screen with the visibly moving highlight.

17. The method of claim 15, wherein:
the causing of the second selected folder icon to be displayed with the visibly moving highlight on the screen includes maintaining display of the first selected folder icon on the screen but with a reduced intensity version of the visibly moving highlight, the reduced intensity version being reduced in at least one of brightness values, color saturation values, or frequency of repetition relative to the visibly moving highlight applied to the second selected folder icon.

18. The method of claim 15, wherein:
the causing of the second selected folder icon to be displayed with the visibly moving highlight on the screen includes maintaining display of the first selected folder icon on the screen but without the visibly moving highlight.

19. The method of claim 15, wherein:
the causing of the second selected folder icon to be displayed with the visibly moving highlight on the screen includes removing the first selected folder icon from the screen.

20. A non-transitory machine-readable storage medium comprising instructions that, when executed by one or more processors of a device, cause the device to perform operations comprising:
by a detection module comprising one or more processors of a device, detecting a current activity in which a user of the device is engaged, the detecting of the current activity being based on context data generated by a set of sensors within the device; and
by an icon module comprising one or more processors of the device:
selecting a folder icon from a first set of folder icons based on the current activity of the user; and causing the selected folder icon from the first set of folder icons to be displayed with a visibly moving highlight on a screen of the device by repeatedly modifying a background image over which an image of the selected folder icon is superimposed, the background image being modified by replacing portions of the background image in a region centered on the selected folder icon with sprite images, the screen of the device displaying the selected folder icon within a second set of folder icons being displayed by the screen, the visibly moving highlight being applied to at least the selected folder icon but fewer than all folder icons in the displayed second set of folder icons, each folder icon in the displayed second set of folder icons corresponding to a different folder among a plurality of folders stored by the device, each folder icon in the displayed second set of folder icons being operable to cause contents of its corresponding folder to be presented on the screen of the device.

21. The non-transitory machine-readable storage medium of claim 20, wherein:
the causing of the selected folder icon to be displayed with the visibly moving highlight on the screen of the device includes at least one of:
repeatedly modifying pixels that form at least one outer edge of an image of the selected folder icon, or
repeatedly modifying pixels of a background image over which the image of the selected folder icon appears superimposed, the modified pixels of the background image being adjacent to at least one outer edge of the image of the selected folder icon.

22. The non-transitory machine readable storage medium of claim 21, wherein:
the repeated modifying of the pixels causes the screen to depict an animated pulsating aura on at least one outer boundary of the selected folder icon.

23. The non-transitory machine-readable storage medium of claim 20, wherein:
the sprite images that replace the portions of the background image cause the screen to depict animated bubbles emanating and rising from the selected folder icon within the region centered on the selected folder icon.

24. The non-transitory machine-readable storage medium of claim 20, wherein:
the sprite images that replace the portions of the background image cause the screen to depict animated fish swimming within the region centered on the selected folder icon.

25. A device comprising:
a detection module comprising one or more processors of the device and configured to detect a current activity in which a user of the device is engaged, the detecting of the current activity being based on context data generated by a set of sensors within the device; and
an icon module comprising one or more processors of the device and configured to:
select a folder icon from a first set of folder icons based on the current activity of the user; and
cause the selected folder icon from the first set of folder icons to be displayed with a visibly moving highlight on a screen of the device by repeatedly modifying a background image over which an image of the selected folder icon is superimposed, the background image being modified by replacing portions of the background image in a region centered on the selected folder icon with sprite images, the screen of the device displaying the selected folder icon within a second set of folder icons being displayed by the screen, the visibly moving highlight being applied to at least the selected folder icon but fewer than all folder icons in the displayed second set of folder icons, each folder icon in the displayed second set of folder icons corresponding to a different folder among a plurality of folders stored by the device, each folder icon in the displayed second set of folder icons being operable to cause contents of its corresponding folder to be presented on the screen of the device.

* * * * *